(12) United States Patent
Saito et al.

(10) Patent No.: US 10,088,085 B2
(45) Date of Patent: Oct. 2, 2018

(54) EXTENDABLE AND CONTRACTIBLE FLEXIBLE JOINT

(71) Applicant: Waterworks Technology Development Organization Co., Ltd., Osaka-shi (JP)

(72) Inventors: Kikuo Saito, Sasayama (JP); Yasuyuki Nagamori, Sanda (JP); Mitsuhiro Mori, Sanda (JP)

(73) Assignee: Waterworks Technology Development Organization Co., Ltd., Osaka (JP)

( * ) Notice: Subject to any disclaimer, the term of this patent is extended or adjusted under 35 U.S.C. 154(b) by 503 days.

(21) Appl. No.: 14/719,437

(22) Filed: May 22, 2015

(65) Prior Publication Data

US 2015/0338003 A1 Nov. 26, 2015

(30) Foreign Application Priority Data

May 23, 2014 (JP) .................................. 2014-107319

(51) Int. Cl.
| | |
|---|---|
| *F16L 27/02* | (2006.01) |
| *F16L 21/02* | (2006.01) |
| *F16L 27/08* | (2006.01) |
| *F16L 27/12* | (2006.01) |
| *F16L 27/04* | (2006.01) |

(52) U.S. Cl.
CPC ............. *F16L 27/026* (2013.01); *F16L 21/02* (2013.01); *F16L 27/04* (2013.01); *F16L 27/0853* (2013.01); *F16L 27/12* (2013.01)

(58) Field of Classification Search
CPC ......... F16L 27/12; F16L 27/04; F16L 27/026; F16L 21/02; F16L 27/0853

USPC ........................... 285/145.1, 145.3, 298, 302
See application file for complete search history.

(56) References Cited

U.S. PATENT DOCUMENTS

| | | | |
|---|---|---|---|
| 3,427,051 A | 2/1969 | White et al. | |
| 3,508,769 A | 4/1970 | Wucherpfennig | |
| 4,482,171 A | 11/1984 | Campbell | |
| 4,776,617 A * | 10/1988 | Sato | F16L 27/026 285/145.3 |
| 5,897,146 A * | 4/1999 | Saito | F16L 27/026 285/145.3 |

(Continued)

FOREIGN PATENT DOCUMENTS

| | | |
|---|---|---|
| JP | 51034718 U1 | 3/1976 |
| JP | 58175 | 2/1993 |

(Continued)

*Primary Examiner* — Greg Binda
*Assistant Examiner* — Zachary T Dragicevich
(74) *Attorney, Agent, or Firm* — The Webb Law Firm

(57) ABSTRACT

An extendable and contractible flexible joint having a pair of flexible joint portions, which are bendable and fitted and connected to a connection sleeve, in a direction of a pipe axial line. An extending motion limiting portion includes a fluid chamber into which a portion of a pressure fluid in a flow path diverges and flows, and is configured to apply a fluid pressure applied to pressure receiving surfaces of the fluid chamber. An inner joint body of each of both the flexible joint portions is configured to be attachable and detachable to and from the connection sleeve, and an outer joint body and the inner joint body of each of both the flexible joint portions are configured to be attachable and detachable to and from each other.

5 Claims, 14 Drawing Sheets

(56) References Cited

U.S. PATENT DOCUMENTS

| | | | | |
|---|---|---|---|---|
| 6,056,329 A | * | 5/2000 | Kitani | F16L 27/026 |
| | | | | 285/145.3 |
| 6,237,965 B1 | * | 5/2001 | Kuo | F16L 27/026 |
| | | | | 285/145.3 X |
| 6,250,690 B1 | * | 6/2001 | Sakai | F16L 27/026 |
| | | | | 285/145.3 |
| 7,503,590 B2 | * | 3/2009 | Challender | 285/302 X |
| 7,717,473 B1 | * | 5/2010 | Zhang | F16L 27/026 |
| | | | | 285/145.3 X |
| 8,480,133 B2 | * | 7/2013 | Zhang | F16L 27/026 |
| | | | | 285/145.1 X |
| 2004/0040606 A1 | * | 3/2004 | Bekki | F16L 27/026 |
| 2010/0295293 A1 | | 11/2010 | Healy et al. | |

FOREIGN PATENT DOCUMENTS

| | | |
|---|---|---|
| JP | H08121665 A | 5/1996 |
| JP | H1130376 A | 2/1999 |
| JP | 4913532 B2 | 4/2012 |
| WO | 2013137241 A1 | 9/2013 |

\* cited by examiner

EXTENDABLE AND CONTRACTIBLE FLEXIBLE JOINT

CROSS-REFERENCE TO RELATED APPLICATION

This application claims priority to Japanese Patent Application No. 2014-107319 filed May 23, 2014, the disclosure of which is hereby incorporated in its entirety by reference.

BACKGROUND OF THE INVENTION

Field of the Invention

The present invention relates to an extendable and contractible flexible joint that includes a pair of flexible joint portions which is bendable and has a connection portion for a fluid transport pipe such as a water pipe or a plant pipe, and a connection sleeve that is fitted and connected across both the flexible joint portions.

Description of Related Art

Each of both of flexible joint portions of this type of an extendable and contractible flexible joint is made up of an outer joint body with a connection portion for a fluid transport pipe, and an inner joint body with a spherical outer circumferential surface slidably fitted to the spherical inner circumferential surface of the outer joint body.

In an extendable and contractible flexible joint in which the connection sleeve is formed integrally with the respective inner joint bodies of both the flexible joint portions, the connection sleeve is made up of an inner fitting sleeve and an outer fitting sleeve which are extendably and contractibly fitted and connected to each other.

A first annular protrusion protrudes from an intermediate portion of the outer circumferential surface of the inner fitting sleeve in the direction of a pipe axial line, and a second annular protrusion for restraining breakup protrudes from a tip end portion of the inner circumferential surface of the outer fitting sleeve so as to be able to come into contact with the first annular protrusion of the inner fitting sleeve in the direction of the pipe axial line. An extension and contraction allowance portion is made up of the first annular protrusion and the second annular protrusion such that relative movement between both the flexible joint portions in the direction of the pipe axial line is allowed in a set movement range (refer to Patent Document 1).

When an external force is applied to this extendable and contractible joint due to an earthquake, land subsidence, or the like, it is possible to absorb the external force while preventing the leakage of a pressure fluid caused by the breakup of configuration members of the extendable and contractible flexible joint by means of the extending and contracting motion of the extension and contraction allowance portion provided between the inner fitting sleeve and the outer fitting sleeve of the connection sleeve, and a bending motion (eccentric motion in a direction perpendicular to the pipe axial line) resulting from relative sliding between the spherical inner circumferential surface of the outer joint body and the spherical outer circumferential surface of the inner joint body, both which form each of the flexible joint portions.

However, when the pressure fluid flows from one of the flexible joint portions toward the other in this type of the extendable and contractible flexible joint, the extension and contraction allowance portion provided between the inner fitting sleeve and the outer fitting sleeve unnecessarily extends due to a fluid pressure, and thus the absorption capacity of the extendable and contractible flexible joint for an external tensile force is decreased, which is a problem.

For example, as illustrated in Patent Document 1, in the related art, there has been proposed a method in which the gap between both the flexible joint portions in the direction of the pipe axial line is maintained to be a set gap by inserting both screw portions of a bolt across a bolt insertion hole of an attachment protrusion that protrudes from the outer circumferential surface of the outer joint body of each of both the flexible joint portions, and fixing the attachment protrusion using nuts screwed onto both the screw portions of the bolt while the attachment protrusion being interposed between the nuts.

RELATED ART DOCUMENT

Patent Document

[Patent Document 1] Japanese Utility Model Application Publication No H5-8175

SUMMARY OF THE INVENTION

In the related art, when an external force induced by an earthquake, land subsidence, or the like fractures a gap limiting bolt provided in a hanging manner across both the flexible joint portions of the extendable and contractible flexible joint, it is possible to absorb the external force by means of the extending motion of the extension and contraction allowance portion and a bending motion resulting from relative sliding between the spherical inner circumferential surface of the outer joint body and the spherical outer circumferential surface of the inner joint body, both which forms each of both the flexible joint portions; however, thereafter, the fractured gap limiting bolt cannot limit the gap any more, and thus the pressure fluid flowing through a flow path causes an unnecessary extending motion of the extension and contraction allowance portion, which is a problem.

The present invention is made in light of these problems, and a main object of the present invention is to provide an extendable and contractible flexible joint in which it is possible to prevent the pressure fluid flowing through a flow path from causing an unnecessary extending motion of an extension and contraction allowance portion while absorbing an external force induced by an earthquake, land subsidence, or the like by means of an extending and contracting motion and a bending motion, and it is possible to improve the ease of assembly of the entire extendable and contractible flexible joint.

According to a first aspect of the present invention, there is provided an extendable and contractible flexible joint including: a pair of flexible joint portions that is bendable and has a connection portion for a fluid transport pipe; a connection sleeve that is fitted and connected across both the flexible joint portions; and an extension and contraction allowance portion that is provided in a fitted connection portion between each of both the flexible joint portions and the connection sleeve, or the connection sleeve such that relative movement between both the flexible joint portions in the direction of a pipe axial line is allowed in a set movement range, in which each of both the flexible joint portions is made up of an outer fitting body with the connection portion, and an inner joint body with a spherical outer circumferential surface slidably fitted to a spherical inner circumferential surface of the outer joint body, and the extendable and contractible flexible joint further including:

an extending motion limiting portion that includes a fluid chamber into which a portion of a pressure fluid in a flow path, formed by both the flexible joint portions and the connection sleeve, diverges and flows, and that is configured to apply a fluid pressure applied to pressure receiving surfaces of the fluid chamber in such a manner that the pressure fluid flowing through the flow path is prevented from causing the extending motion of the extension and contraction allowance portion, and the inner joint body of each of both the flexible joint portions is configured in such a manner as to be attachable and detachable to and from the connection sleeve in the direction of the pipe axial line, and the outer joint body and the inner joint body of each of both the flexible joint portions are configured in such a manner as to be attachable and detachable to and from each other in the direction of the pipe axial line.

With this configuration, when the pressure fluid flows through the flow path formed by both the flexible joint body and the connection sleeve, a portion of the pressure fluid diverges and flows into the fluid chamber of the extending motion limiting portion, a fluid pressure applied to the pressure receiving surfaces of the fluid chamber is applied such that the pressure fluid flowing through the flow path is prevented from causing the extending motion of the extension and contraction allowance portion. Therefore, it is possible to maintain the extension and contraction allowance portion in a set state when the pressure fluid starts to flow.

When an external force is applied to the extendable and contractible flexible joint due to an earthquake, land subsidence, or the like, it is possible to absorb the external force while preventing the leakage of the pressure fluid caused by the breakup of configuration members of the extendable and contractible flexible joint by means of the extending and contracting motion of the extension and contraction allowance portion provided in a fitted connection portion between each of both the flexible joint portions and the connection sleeve, or in the connection sleeve, and a bending motion resulting from relative sliding between the spherical inner circumferential surface of the outer joint body and the spherical outer circumferential surface of the inner joint body, which form each of the flexible joint portions.

Also after the external force is absorbed, the fluid pressure applied to the pressure receiving surfaces of the fluid chamber of the extending motion limiting portion is continuously applied such that the pressure fluid flowing through the flow path is prevented from causing the extending motion of the extension and contraction allowance portion. Therefore, it is possible to maintain the extension and contraction allowance portion in a state when the external force is absorbed.

In particular, the extending motion force of the extension and contraction allowance portion is increased as the pressure of the pressure fluid in the flow path is increased; however, the pressure of the pressure fluid flowing into the fluid chamber divergently from the flow path is proportionally increased. Therefore, typically, it is possible to prevent the extending motion of the extension and contraction allowance portion using a preventive force corresponding to a change in the internal pressure of the flow path.

Since it is possible to attach and detach the inner joint bodies of each of both the flexible joint portions relative to the connection sleeve in the direction of the pipe axial line, and to possible to attach and detach the outer joint body and the inner joint body of each of both the flexible joint portions relative to each other in the direction of the pipe axial line, the entire extendable and contractible flexible joint with the extension and contraction allowance portion and the extending motion limiting portion can be easily structured so that the extendable and contractible flexible joint is easily assembled in the direction of the pipe axial line.

Accordingly, it is possible to prevent the pressure fluid flowing through the flow path from causing an unnecessary extending motion of the extension and contraction allowance portion while an external force induced by an earthquake, land subsidence, or the like is absorbed by means of an extending and contracting motion and a bending motion, and it is possible to improve the ease of assembly of the extendable and contractible flexible joint with the extension and contraction allowance portion and the extending motion limiting portion.

In the extendable and contractible flexible joint according to a second aspect of the present invention, the extending motion limiting portion may include: an annular protrusion that protrudes from an intermediate portion of an outer circumferential surface of the inner fitting sleeve out of the outer fitting sleeve and the inner fitting sleeve of the connection sleeve, both of which are extendable and contractible; a limiting sleeve that encloses the annular protrusion in such a manner as to be able to slide against the annular protrusion, and is attachably and detachably bayonet-joined to an end portion on a sleeve-connection side of the outer fitting sleeve; and the fluid chamber that is sealed with a first surface of the annular protrusion positioned opposite to the position of a bayonet joint portion, and an inner surface of the limiting sleeve, and communicates with the flow path via through holes formed in the inner fitting sleeve, in which a fluid pressure applied to the pressure receiving surfaces of the fluid chamber may be applied to the inner fitting sleeve and the outer fitting sleeve via the annular protrusion and the limiting sleeve such that the pressure fluid flowing through the flow path is prevented from causing the extending motion of the extension and contraction allowance portion.

With this configuration, when the pressure fluid flows through the flow path formed by both the flexible joint portions and the connection sleeve, a portion of the pressure fluid flows into the fluid chamber (sealed with a first surface of the annular protrusion and the inner surface of the limiting sleeve) via the through holes formed in the inner fitting sleeve, and the fluid pressure applied to the pressure receiving surfaces of the fluid chamber is applied to the inner fitting sleeve and the outer fitting sleeve via the annular protrusion and the limiting sleeve such that the pressure fluid flowing through the flow path is prevented from causing the extending motion of the extension and contraction allowance portion. Therefore, it is possible to maintain the extension and contraction allowance portion in a set state when the pressure fluid starts to flow.

Also after the external force induced by an earthquake, land subsidence, or the like is absorbed, the fluid pressure applied to the pressure receiving surfaces of the fluid chamber is continuously applied to the inner fitting sleeve and the outer fitting sleeve via the annular protrusion and the limiting sleeve due to the pressure fluid inflowing via the through holes of the inner fitting sleeve. Therefore, it is possible to prevent the pressure fluid flowing through the flow path from causing an unnecessary extending motion of the extension and contraction allowance portion, and it is possible to maintain the extension and contraction allowance portion in a state when the external force is absorbed.

Since the inner space of the limiting sleeve is partitioned into two chambers by the annular protrusion of the inner fitting sleeve, and the fluid chamber is configured as a chamber out of the two chambers positioned opposite to the position of a bayonet joint, the inside air of the other chamber can be smoothly discharged to the outside via gaps in a bayonet joint structure.

As a result, an air suction and discharge structure, which allows a smooth extending and contracting motion of the extension and contraction allowance portion, can be easily formed using the bayonet joint by which the limiting sleeve is attachably and detachably attached to the end portion on the sleeve-connection side of the outer fitting sleeve.

When the extendable and contractible flexible joint is assembled, the inner fitting sleeve and the outer fitting sleeve of the connection sleeve are fitted together in such a manner as to be extendable and contractible in the direction of the pipe axial line, and the limiting sleeve, fitted onto the outer circumferential surface of the inner fitting sleeve from the other end side of the inner fitting sleeve along the direction of the pipe axial line, is bayonet-joined to the end portion on the sleeve-connection side of the outer fitting sleeve.

Subsequently, the outer joint body and the inner joint body of each of both the flexible joint portions are joined together in the direction of the pipe axial line, and then both inner joint bodies are respectively joined to the other end portion of the inner fitting sleeve and the other end portion of the outer fitting sleeve in the direction of the pipe axial line. Alternatively, both inner joint bodies are respectively joined to the other end portion of the inner fitting sleeve and the other end portion of the outer fitting sleeve in the direction of the pipe axial line, and then the outer joint body is joined to the inner joint body in the direction of the pipe axial line.

As a result, it is possible to efficiently and easily assemble a plurality of components of the extendable and contractible flexible joint in sequence in the direction of the pipe axial line.

In the extendable and contractible flexible joint according to a third aspect of the present invention, the extending motion limiting portion may include: a bypass pipe that is connected across the respective outer joint bodies of both the flexible joint portions while being installed outside; and the fluid chamber into which a portion of the pressure fluid in a bypass flow path of the bypass pipe flows, in which a fluid pressure applied to the pressure receiving surfaces of the fluid chamber may be applied to the respective outer joint bodies of both the flexible joint portions via the bypass pipe such that the pressure fluid flowing through the flow path is prevented from causing the extending motion of the extension and contraction allowance portion.

With this configuration, when the pressure fluid flows through the flow path formed by both the flexible joint portions and the connection sleeve, a portion of the pressure fluid diverges into the bypass pipe, which is connected across the respective outer joint bodies of both the flexible joint bodies while being installed outside, and a portion of the pressure fluid in the bypass flow path of the bypass pipe flows into the fluid chamber, and the fluid pressure applied to the pressure receiving surfaces of the fluid chamber is applied to both the outer joint bodies via the bypass pipe such that the pressure fluid flowing through the flow path is prevented from causing the extending motion of the extension and contraction allowance portion. Therefore, it is possible to maintain the extension and contraction allowance portion in a set state when the pressure fluid starts to flow.

Also after the external force induced by an earthquake, land subsidence, or the like is absorbed, the fluid pressure applied to the pressure receiving surfaces of the fluid chamber is continuously applied to the respective outer joint bodies of both the flexible joint portions via the bypass pipe due to the pressure fluid inflowing via the bypass flow path. Therefore, it is possible to prevent the pressure fluid flowing through the flow path from causing an unnecessary extending motion of the extension and contraction allowance portion, and it is possible to maintain the extension and contraction allowance portion in a state when the external force is absorbed.

In the extendable and contractible flexible joint according to a fourth aspect of the present invention, the extending motion limiting portion may include: an annular movable body that is provided in such a manner as to be able to slide along an outer circumferential surface of the connection sleeve in the direction of the pipe axial line; a cylindrical movable case that encloses the annular movable body in such a manner as to be able to slide against the annular movable body, and is provided in such a manner as to be able to slide along the outer circumferential surface of the connection sleeve in the direction of the pipe axial line; the fluid chamber that is sealed with a first surface of the annular movable body and an inner surface of the cylindrical movable case, and communicates with the flow path via a through hole formed in the connection sleeve; a first connection mechanism that connects the cylindrical movable case to the outer joint body of one of the flexible joint portions; and a second connection mechanism that connects the annular movable body to the outer joint body of the other of the flexible joint portions, in which a fluid pressure applied to the pressure receiving surfaces of the fluid chamber may be applied to the respective outer joint bodies of both the flexible joint portions via the annular movable body, the cylindrical movable case, the first connection mechanism, and the second connection mechanism such that the pressure fluid flowing through the flow path is prevented from causing the extending motion of the extension and contraction allowance portion.

With this configuration, when the pressure fluid flows through the flow path formed by both the flexible joint portions and the connection sleeve, a portion of the pressure fluid flows into the fluid chamber (sealed with the first surface of the annular movable body and the inner surface of the cylindrical movable case) via the through hole formed in the connection sleeve, and the fluid pressure applied to the pressure receiving surfaces of the fluid chamber is applied to the respective outer joint bodies of both the flexible joint portions via the annular movable body, the cylindrical movable case, the first connection mechanism, and the second connection mechanism such that the pressure fluid flowing through the flow path is prevented from causing the extending motion of the extension and contraction allowance portion. Therefore, it is possible to maintain the extension and contraction allowance portion in a set state when the pressure fluid starts to flow.

Also after the external force induced by an earthquake, land subsidence, or the like is absorbed, the fluid pressure applied to the pressure receiving surfaces of the fluid chamber is continuously applied to the respective outer joint bodies of both the flexible joint portions via the annular movable body due to the pressure fluid inflowing via the through hole of the connection sleeve, the cylindrical movable case, the first connection mechanism, and the second connection mechanism. Therefore, it is possible to prevent the pressure fluid flowing through the flow path from causing an unnecessary extending motion of the extension and contraction allowance portion, and it is possible to maintain the extension and contraction allowance portion in a state when the external force is absorbed.

In the extendable and contractible flexible joint according to a fifth aspect of the present invention, the cross-sectional area of the fluid chamber of the extending motion limiting portion may be set to be equal to the internal cross-sectional area of the connection sleeve.

With this configuration, since the extending force of the extension and contraction allowance portion induced by the pressure fluid in the flow path balances out the extension preventive force induced by the pressure fluid in the fluid chamber, it is possible to reliably prevent the pressure fluid from causing an unnecessary extending motion of the extension and contraction allowance portion.

In the extendable and contractible flexible joint according to a sixth aspect of the present invention, a limiting rod may be attachably and detachably provided in a hanging manner across attachment portions, which protrude from an outer surface of the outer joint body of each of both the flexible joint portions, and limit the gap between both the outer joint bodies to a set gap, and is fractured by an external force greater than or equal to a set value.

With this configuration, when the limiting rod is provided in a hanging manner across the attachment portions of the outer joint bodies of both the flexible joint portions, it is possible to fix the entire length of the extendable and contractible flexible joint to a set gap, and to fix the directional posture of both the outer joint bodies in a set posture during the transportation of the extendable and contractible flexible joint that does not contain the pressure fluid, during pipe installation, or the like. Therefore, it is possible to easily and efficiently transport the extendable and contractible flexible joint or install pipes.

When the limiting rod, provided in a hanging manner across both the flexible joint portions of the extendable and contractible flexible joint, are fractured by an external force greater than or equal to a set value induced by an earthquake, land subsidence, or the like, it is possible to absorb the external force while preventing the leakage of the pressure fluid caused by the breakup of configuration members of the extendable and contractible flexible joint by means of the extending and contracting motion of the extension and contraction allowance portion, and a bending motion resulting from relative sliding between the spherical inner circumferential surface of the outer joint body and the spherical outer circumferential surface of the inner joint body, both which form each of the flexible joint portions.

When the external force is absorbed, a portion of the pressure fluid in the flow path (formed by both the flexible joint portions and the connection sleeve) diverges and flows into the fluid chamber of the extending motion limiting portion, and thus the fluid pressure applied to the pressure receiving surfaces of the fluid chamber is applied such that the pressure fluid flowing through the flow path is prevented from causing the extending motion of the extension and contraction allowance portion. Therefore, it is possible to maintain the extension and contraction allowance portion in a state when the external force is absorbed.

When the limiting rod is provided in a hanging manner across the attachment portions of the outer joint bodies of both the flexible joint portions, an extending and contracting motion and a bending motion cannot be activated until the limiting rod is fractured. Therefore, it is difficult to set the fracture load of the limiting rod. However, in the present invention, since the limiting rod is attachably and detachably provided in a hanging manner, when the limit rod is removed from the attachment portions of both the outer joint bodies after the installation of pipes with the extendable and contractible flexible joint is completed, it is also possible to absorb an external force greater than or equal to a set value by means of the extending and contracting motion and the bending motion of the extendable and contractible flexible joint.

In the extendable and contractible flexible joint according to a seventh aspect of the present invention, flexible connection portions may be respectively provided in an upstream portion and a downstream portion of the bypass pipe, and allow bending resulting from sliding between the spherical inner circumferential surface of the outer joint body and the spherical outer circumferential surface of the inner joint body.

With this configuration, when an external force is applied to the extendable and contractible flexible joint in an eccentric direction perpendicular to the pipe axial line, a bending motion, resulting from relative sliding between the spherical inner circumferential surface of the outer joint body and the spherical outer circumferential surface of the inner joint body, both which form each of the flexible joint portions, can be reliably and smoothly performed by means of the bending follower function of the flexible connection portions provided in the upstream portion and the downstream portion of the bypass pipe.

In the extendable and contractible flexible joint according to an eighth aspect of the present invention, the bypass pipes may be connected to a plurality of circumferential locations in the respective outer joint bodies of both the flexible joint portions, and the total cross-sectional area of the respective fluid chambers of the bypass pipes may be set to be equal to the internal cross-sectional area of the connection sleeve.

With this configuration, since it is possible to set the total cross-sectional area of the fluid chambers of the bypass pipes to be equal to the internal cross-sectional area of the connection sleeve while preventing the bypass pipe from radially extending toward the outside by dispersedly disposing the bypass pipes at a plurality of circumferential locations in the entire extendable and contractible flexible joint with both the outer joint bodies, and reducing the size of the fluid chamber of the bypass pipe, the extending force of the extension and contraction allowance portion induced by the pressure fluid in the flow path balances out the total extension preventive force induced by the pressure fluid in the fluid chambers, it is possible to reliably prevent the pressure fluid from causing an unnecessary extending motion of the extension and contraction allowance portion.

In the extendable and contractible flexible joint according to a ninth aspect of the present invention, flexible connection portions may be respectively provided in a connection portion between the first connection mechanism and the outer joint body of one of the flexible joint portions, and in a connection portion between the second connection mechanism and the outer joint body of the other of the flexible joint portions, and allows bending resulting from sliding between the spherical inner circumferential surface of the outer joint body and the spherical outer circumferential surface of the inner joint body.

With this configuration, when an external force is applied to the extendable and contractible flexible joint in an eccentric direction perpendicular to the pipe axial line, a bending motion, resulting from relative sliding between the spherical inner circumferential surface of the outer joint body and the spherical outer circumferential surface of the inner joint body, both which form each of the flexible joint portions, can be reliably and smoothly performed by means of the bending follower function of the flexible connection portion provided in the connection portion between the first connection mechanism and the outer joint body of one of the flexible joint portions, and in the connection portion between the second connection mechanism and the outer joint body of the other of the flexible joint portions.

DESCRIPTION OF THE INVENTION

First Embodiment

Figure 1:
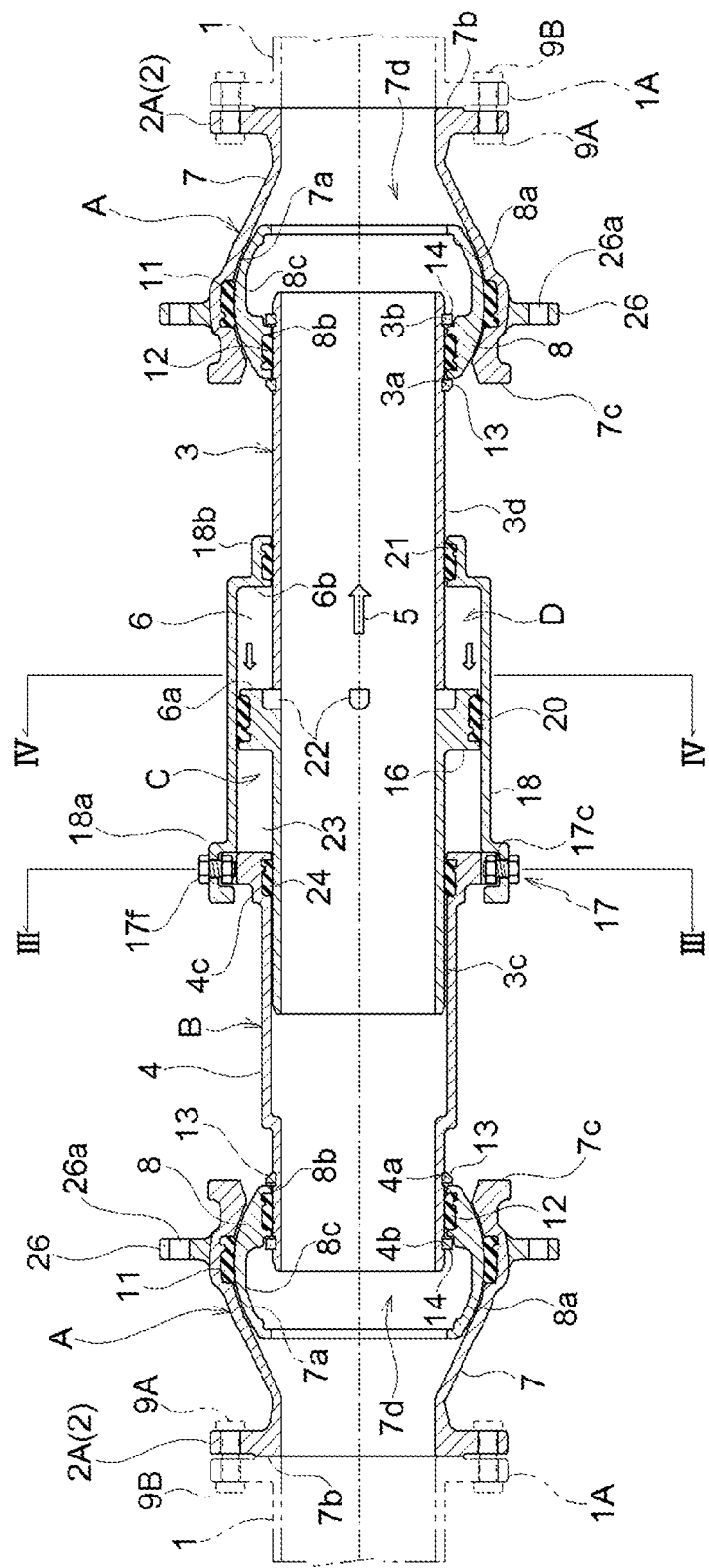
FIG. 1 is a longitudinal sectional view of an extendable and contractible flexible joint of a first embodiment.

FIGS. 1 to 6 illustrates an extendable and contractible flexible joint that includes a pair of flexible joint portions A that is made of cast iron, is bendable, and has a connection portion 2 for a water pipe 1 which is an example of a fluid transport pipe, and a connection sleeve B which is made of cast iron, and is fitted and connected across both the flexible joint portions A.

The connection sleeve B of the extendable and contractible flexible joint is made up of an inner fitting sleeve 3 and an outer fitting sleeve 4 which are fitted and connected together in such a manner that the inner fitting sleeve 3 and the outer fitting sleeve 4 are extendable and contractible in the direction of a pipe axial line and are rotatable relative to each other. An extension and contraction allowance portion C is provided between the inner fitting sleeve 3 and the outer fitting sleeve 4 such that relative movement between both the flexible joint portions A in the direction of the pipe axial line is allowed in a set movement range.

The extendable and contractible flexible joint is provided with extending motion limiting portion D that includes a fluid chamber 6 into which a portion of tap water (an example of a pressure fluid) in a flow path 5 (formed by both the flexible joint portions A and the connection sleeve B) diverges and flows, and that is configured to apply the water pressure of the inflowing tap water to pressure receiving surfaces 6a and 6b (surfaces facing each other in the direction of the pipe axial line) of the fluid chamber 6 in such a manner that the water pressure (an example of a fluid pressure) of the tap water flowing through the flow path 5 is prevented from causing the extending motion of the extension and contraction allowance portion C.

Each of both the flexible joint portions A is made up of a circular cylindrical outer joint body 7 with the connection portion 2, and a cylindrical ball-shaped (the shape of a hollow ball with both ends cut in the direction of the pipe axial line) inner joint body 8 with a spherical outer circumferential surface 8a that is slidably fitted to a spherical inner circumferential surface 7a of the outer joint body 7.

The inner joint body 8 is configured in such a manner as to be attachable and detachable to and from the connection sleeve B in the direction of the pipe axial line, and the outer joint body 7 and the inner joint body 8 are configured in such a manner as to be attachable and detachable to and from each other in the direction of the pipe axial line.

An annular connection flange 2A is an example of the connection portion 2, and is integrally formed on the outer circumferential surface of a first connection opening portion 7b of the outer joint body 7 adjacent to the water pipe 1, and the annular connection flange 2A is water-tightly, and attachably and detachably fixed connected to a connection flange 1A of the water pipe 1 using bolts 9A and nuts 9B.

Figure 5:
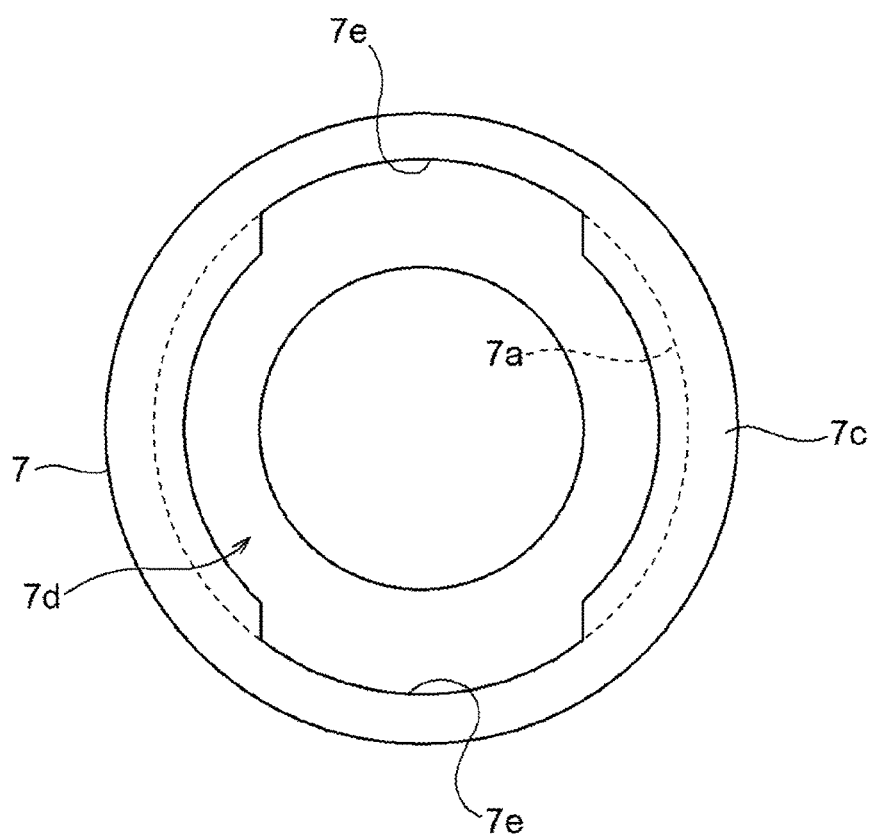
FIG. 5 is a front view of an outer joint body of the extendable and contractible flexible joint.

A second connection opening portion 7c on the other end side of the outer joint body 7 is made to have an inner opening diameter smaller than the maximum outer diameter of the spherical outer circumferential surface 8a of the inner joint body 8. As illustrated in FIG. 5, cut-away portions 7e are respectively formed at two locations (facing each other in a diameter direction) in the second connection opening portion 7c of the outer joint body 7 in such a manner as to communicate with an inner space 7d formed by the spherical inner circumferential surface 7a of the outer joint body 7 in a state where each of the cut-away portions 7e penetrates into the inner space 7d in the direction of the pipe axial line while having a circumferential width slightly greater than the length of the inner joint body 8 in the direction of the pipe axial line, and a radial depth that allows the maximum outer diameter portion of the spherical outer circumferential surface 8a of the inner joint body 8 to be able to pass through the cut-away portions 7e.

Figure 2:
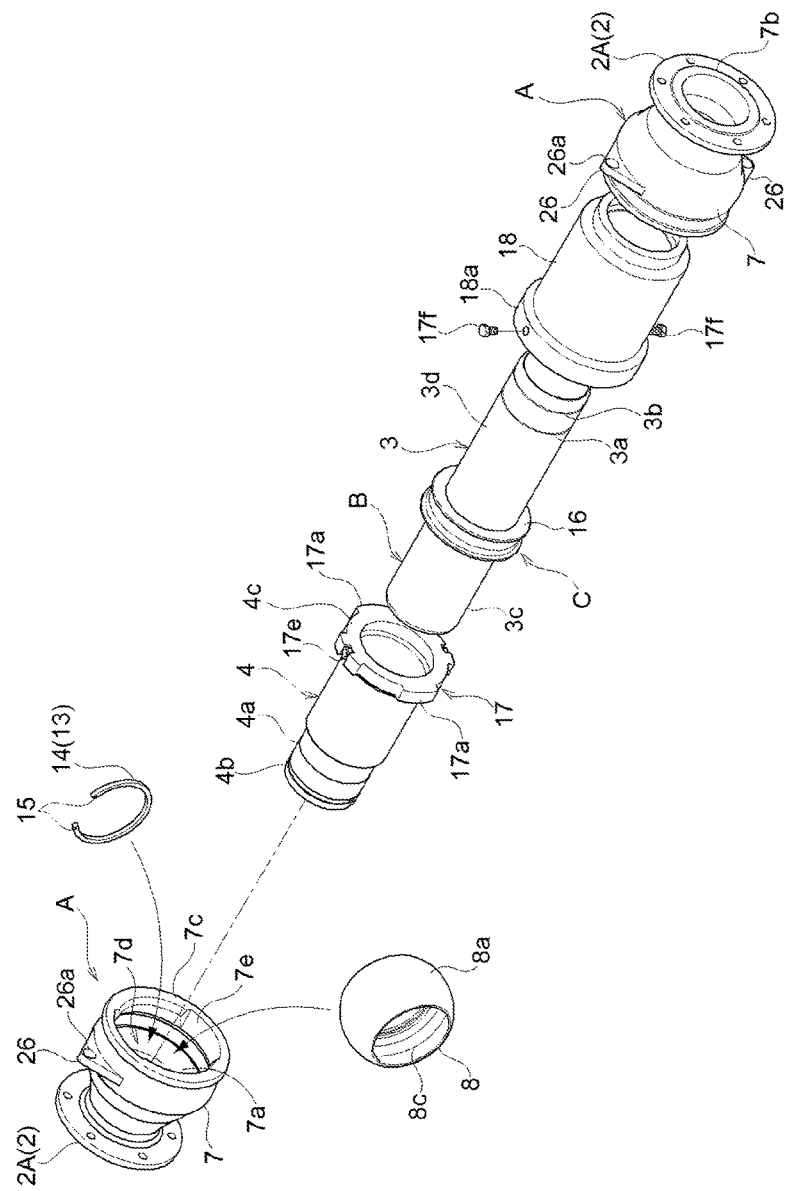
FIG. 2 is an exploded perspective view of the extendable and contractible flexible joint.

As illustrated in FIG. 2, when the inner joint body 8 is assembled into the inner space 7d of the outer joint body 7, the inner joint body 8 is inserted into the inner space 7d of the outer joint body 7 via the respective cut-away portions 7e of the second connection opening portions 7c while maintaining an attachable and detachable posture in which the cylindrical axis of the inner joint body 8 is perpendicular to the pipe axial line, and then, the inner joint body 8 is rotated to be in a normal installation posture in which the cylindrical axis coincides with the pipe axial line. In this normal installation posture, the spherical inner circumferential surface 7a of the outer joint body 7 and the spherical outer circumferential surface 8a of the inner joint body 8 are fitted together in such a manner to be able to slide along the spherical surface while being retained.

A first rubber ring 11 is installed in an annular seal installation groove formed in the maximum inner diameter portion of the spherical inner circumferential surface 7a of the outer joint body 7, and works as a seal member that is configured to slidably and water-tightly seal a gap between the spherical inner circumferential surface 7a and the spherical outer circumferential surface 8a of the inner joint body 8.

A fitting inner circumferential surface 8b and an annular concave portion 8c are formed on an inner circumferential side of the inner joint body 8, the fitting inner circumferential surface 8b is slidably fitted to the outer circumferential surface of the connection sleeve B, and the annular concave portion 8c is concave in an annular shape outside of the outer circumferential surface of the connection sleeve B. A second rubber ring 12 is installed in an annular seal installation groove formed in the fitting inner circumferential surface 8b of the inner joint body 8, and works as a seal member that is configured to slidably and water-tightly seal a gap between the fitting inner circumferential surface 8b and the outer circumferential surface of the connection sleeve B.

As illustrated in FIGS. 1 and 2, a first annular ring installation groove 4a and a second annular ring installation groove 4b are formed in an upstream end portion of the outer circumferential surface of the outer fitting sleeve 4 of the connection sleeve B, and a first annular ring installation groove 3a and a second annular ring installation groove 3b are formed in a downstream end portion of the outer circumferential surface of the inner fitting sleeve 3 of the connection sleeve B. First lock rings 13 are attachably and detachably installed in the first ring grooves 4a and 3a, respectively, and each of the first lock rings 13 comes into contact with a tip end surface of the inner joint body 8 (fitted onto the outer circumferential surface of the connection sleeve B) in the direction of the pipe axial line. Second lock rings 14 are attachably and detachably installed in the second ring installation grooves 4b and 3b, respectively, and each of the second lock rings 14 comes into contact with an inside end surface (surface of the annular concave portion 8c being connected to the fitting inner circumferential surface 8b) of the annular concave portion 8c of the inner joint body 8 in the direction of the pipe axial line.

Since the first lock ring 13 and the second lock ring 14 come into contact with the inner joint body 8, the inner joint body 8 is fixed in such a manner as to be unable to move relative to the connection sleeve B in the direction of the pipe axial line.

As illustrated in FIG. 2, each of the first lock ring 13 and the second lock ring 14 is formed in the shape of a C, which is cut and separated at one circumferential location and can be elastically deformed in a direction in which the diameter of each of the first lock ring 13 and the second lock ring 14 is increased. Engagement holes 15, which are an example of an engaging portion, are respectively formed in both of cut and separated end portions of each of the first lock ring 13 and the second lock ring 14 such that both engaging portions of a diameter increasing tool (not illustrated) for increasing the diameter of each of the first lock ring 13 and the second lock ring 14 can be engaged and disengaged with and from the engagement holes 15.

When the flexible joint portion A is assembled with an end portion of the connection sleeve B in the direction of the pipe axial line, first, the first lock ring 13, the diameter of which is increased by counteracting an elastic restoring force using the diameter increasing tool, is installed on the outer circumferential surface of the connection sleeve B, and when the diameter increasing force of the diameter increasing tool is released at a ring installation position corresponding to each of the first ring installation grooves 3a and 4a, the diameter of the first lock ring 13 is reduced due to the elastic restoring force, and the first lock ring 13 is fitted, held in each of the first ring installation grooves 3a and 4a.

Subsequently, the inner joint body 8 of the flexible joint portion A is installed on the outer circumferential surface of the connection sleeve B until the inner joint body 8 comes into contact with the first lock ring 13 installed on the connection sleeve B, the diameter of the second lock ring 14 inserted into the annular concave portion 8c of the inner joint body 8 is increased using the diameter increasing tool that is inserted into the annular concave portion 8c of the inner joint body 8 via the first connection opening portion 7b of the outer joint body 7, and the second lock ring 14 with an increased diameter is installed on the outer circumferential surface of the connection sleeve B, and when the diameter increasing force of the diameter increasing tool is released at a ring installation position corresponding to each of the second ring installation grooves 3b and 4b, the diameter of the second lock ring 14 is reduced due to an elastic restoring force, and the second lock ring 14 is fitted, held in each of the second ring installation grooves 3b and 4b.

The extension and contraction allowance portion C includes an annular protrusion 16 and a limiting sleeve 18 made of cast iron. The annular protrusion 16 protrudes from an intermediate portion of the outer circumferential surface of the inner fitting sleeve 3 in the direction of the pipe axial line, and the limiting sleeve 18 encloses the annular protrusion 16 in such a manner as to be able to slide against the annular protrusion 16 in the direction of the pipe axial line and to rotate relative thereto, and is attachably and detachably joined to an end portion on a sleeve-connection side of the outer fitting sleeve 4 using bayonet joints 17.

When the limiting sleeve 18 is assembled, the inner fitting sleeve 3 and the outer fitting sleeve 4 of the connection sleeve B are fitted together in such a manner as to be extendable and contractible in the direction of the pipe axial line before the flexible joint portion A is assembled, and the limiting sleeve 18 is fitted onto the outer circumferential surface of the inner fitting sleeve 3 from the other end side of the inner fitting sleeve 3 along the direction of the pipe axial line, and is joined to the end portion on the sleeve-connection side of the outer fitting sleeve 4 using the bayonet joints 17.

A sliding portion 18b of the limiting sleeve 18 slides along a downstream outer circumferential surface portion 3d out of an upstream outer circumferential surface portion 3c and the downstream outer circumferential surface portion 3d partitioned off by the annular protrusion 16 on the outer circumferential surface of the inner fitting sleeve 3, and the sliding portion 18b is configured as an extension stopper portion that limits the maximum sleeve extending position in an allowable extension range by coming into contact with a first surface (positioned opposite to the position of the bayonet joint 17) of the annular protrusion 16 of the inner fitting sleeve 3.

A sliding portion 4c of the outer fitting sleeve 4 slides along the upstream outer circumferential surface portion 3c of the inner fitting sleeve 3, and the sliding portion 4c is configured as a contraction stopper portion that limits the maximum sleeve contracting position in the allowable extension range by coming into contact with a second surface (positioned facing the bayonet joint 17) of the annular protrusion 16 of the inner fitting sleeve 3.

The bayonet joint 17 includes engaging protrusions 17a, and attachment and detachment concave portions 17b. The engaging protrusions 17a are integrally formed at a plurality of circumferential locations (four locations in this embodiment) on the outer circumferential surface of the sliding portion 4c of the outer fitting sleeve 4, the attachment and detachment concave portion 17b is formed in a connection opening portion 18a of the limiting sleeve 18, and the engaging protrusion 17a of the outer fitting sleeve 4 attachably and detachably passes through the attachment and detachment concave portion 17b in the direction of the pipe axial line.

An annular engagement groove 17c is formed inside of the connection opening portion 18a of the limiting sleeve 18 in such a manner as to allow the turning of the engaging protrusion 17a about the pipe axial line, the engaging protrusion 17a passing through the attachment and detachment concave portion 17b and being positioned at an attachment and detachment operating position, and an inner wall surface part 18c (positioned between the adjacent attachment and detachment concave portions 17b disposed in a circumferential direction) of the inner wall surface of the connection opening portion 18a facing the annular engagement groove 17c is configured as an engagement surface that comes into contact with the engaging protrusion 17a and prevents the engaging protrusion 17a from moving and being separated in the direction of the pipe axial line, when the engaging protrusion 17a turns from the attachment and detachment operating position to an engagement operating position on the annular engagement groove 17c.

Figure 3:
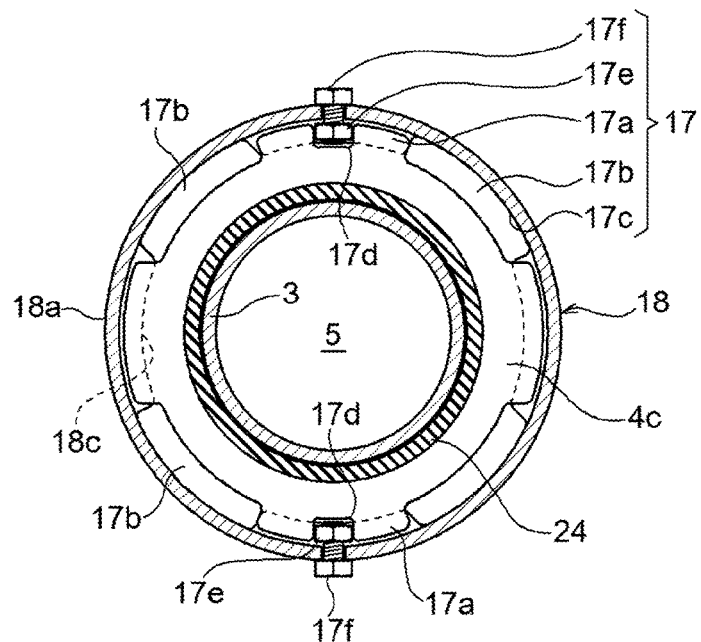
FIG. 3 is a lateral sectional view taken along line III-III in FIG. 1.
Figure 4:
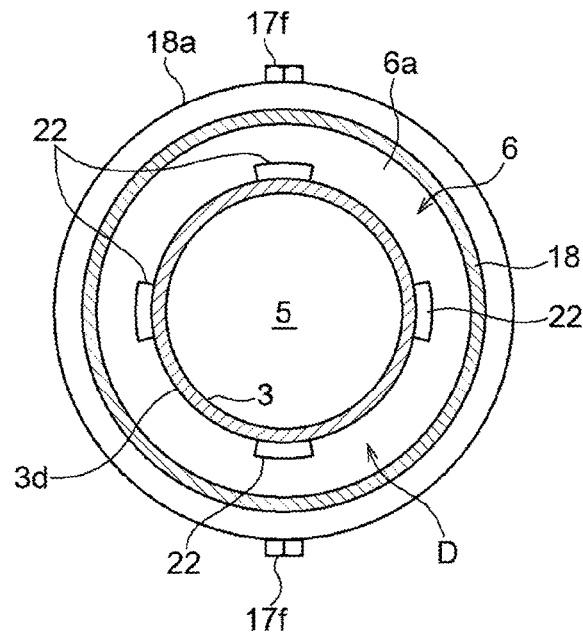
FIG. 4 is a lateral sectional view taken along line IV-IV in FIG. 1.

As illustrated in FIGS. 2 and 3, fixation concave portions 17d are respectively formed in circumferential center portions of a set of the engaging protrusions 17a (facing each other in a radial direction) out of the engaging protrusions 17a of the outer fitting sleeve 4, and each of the fixation concave portions 17d opens radially toward the outside. On an outer circumferential surface of the connection opening portion 18a of the limiting sleeve 18, a lock nut 17f is radially screwed into an engaged nut 17e from the outside, the engaged nut 17e being disposed in the fixation concave portion 17d of each of both the engaging protrusion 17a present at engagement operating positions on the annular engagement groove 17c.

Subsequently, as illustrated in FIG. 1, in the configuration of the extending motion limiting portion D, a third rubber ring 20 is installed in an annular seal installation groove formed in the outer circumferential surface of the annular protrusion 16 of the inner fitting sleeve 3, and works as a seal member that is configured to slidably and water-tightly seal a gap between the outer circumferential surface of the annular protrusion 16 and the inner circumferential surface of the limiting sleeve 18, and a fourth rubber ring 21 is installed in an annular seal installation groove formed in the inner circumferential surface of the sliding portion 18b of the limiting sleeve 18, and works as a seal member that is configured to slidably and water-tightly seal a gap between the inner circumferential surface of the sliding portion 18b and the downstream outer circumferential surface portion 3d of the inner fitting sleeve 3.

As a result, the fluid chamber 6 is configured as a downstream chamber out of two annular chambers in the inner space of the limiting sleeve 18, which are partitioned off by the annular protrusion 16 of the inner fitting sleeve 3, and are sealed with the third rubber ring 20 and the fourth rubber ring 21.

The fluid chamber 6 communicates with the flow path 5 via a plurality (four in this embodiment) of circumferential through holes 22 which pass through a region in which the annular protrusion 16 of the inner fitting sleeve 3 is formed, and a portion of tap water in the flow path 5 flows into the fluid chamber 6 via the through holes 22.

The water pressure of the inflowing tap water to the pressure receiving surfaces 6a and 6b (facing each other in the direction of the pipe axial line) of the fluid chamber 6 is applied to the inner fitting sleeve 3 and the outer fitting sleeve 4 via the annular protrusion 16 and the limiting sleeve 18 such that the water pressure of the tap water flowing through the flow path 5 is prevented from causing the extending motion of the extension and contraction allowance portion C.

The cross-sectional area of the fluid chamber 6 of the extending motion limiting portion D is set to be equal to the internal cross-sectional area of the inner fitting sleeve 3 of the connection sleeve B, and the extending force of the extension and contraction allowance portion C induced by the water pressure of the tap water flowing through the flow path 5 balances out the extension preventive force induced by the water pressure of the tap water flowing into the fluid chamber 6.

An upstream chamber in the inner space of the limiting sleeve 18 is configured as an air chamber 23 that communicates with an external space via apertures formed in the bayonet joints 17, the air inside the air chamber 23 is discharged to the external space as the inner fitting sleeve 3 and the outer fitting sleeve 4 undergo a contracting motion, and the air is suctioned into the air chamber 23 from the external space as the inner fitting sleeve 3 and the outer fitting sleeve 4 undergo an extending motion.

A fifth rubber ring 24 is installed in an annular seal installation groove formed in the inner circumferential surface of the sliding portion 4c of the outer fitting sleeve 4, and works as a seal member that is configured to slidably and water-tightly seal a gap between the inner circumferential surface of the sliding portion 4c and the upstream outer circumferential surface portion 3c of the inner fitting sleeve 3.

In the extendable and contractible flexible joint with the aforementioned configuration, when tap water flows through the flow path 5 formed by both the flexible joint portions A and the connection sleeve B, a portion of the tap water flows into the downstream fluid chamber 6 (sealed with the first surface of the annular protrusion 16 and the inner surface of the limiting sleeve 18) via the through holes 22 formed in the inner fitting sleeve 3, and the water pressure of the inflowing tap water to the pressure receiving surfaces 6a and 6b (facing each other in the direction of the pipe axial line) of the fluid chamber 6 is applied to the inner fitting sleeve 3 and the outer fitting sleeve 4 via the annular protrusion 16 and the limiting sleeve 18 such that the water pressure of the tap water flowing through the flow path 5 is prevented from causing the extending motion of the extension and contraction allowance portion C. Therefore, it is possible to maintain the extension and contraction allowance portion C in a set state when the tap water starts to flow.

Figure 6:
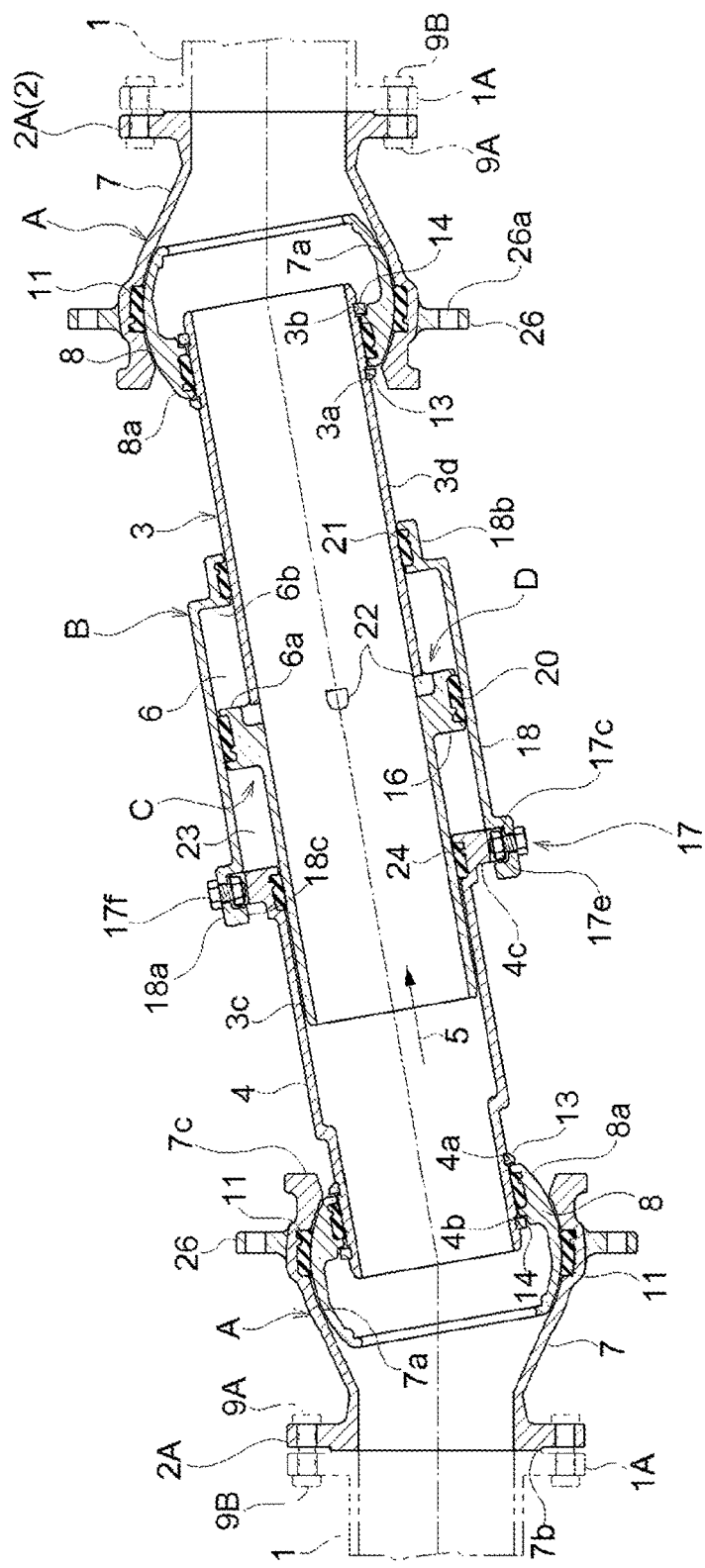
FIG. 6 is a lateral sectional view of the bent extendable and contractible flexible joint.

When an external force is applied to the extendable and contractible flexible joint due to an earthquake, land subsidence, or the like, as illustrated in FIG. 6, it is possible to absorb the external force while preventing the leakage of the tap water caused by the breakup of configuration members of the extendable and contractible flexible joint by means of the extending and contracting motion of the extension and contraction allowance portion C provided between the inner fitting sleeve 3 and the outer fitting sleeve 4 of the connection sleeve B, and a bending motion resulting from relative sliding between the spherical inner circumferential surface 7a of the outer joint body 7 and the spherical outer circumferential surface 8a of the inner joint body 8.

Also when the external force is absorbed, the water pressure of the inflowing tap water to the pressure receiving surfaces 6a and 6b (facing each other in the direction of the pipe axial line) of the fluid chamber 6 is continuously applied such that the water pressure of the tap water flowing through the flow path 5 is prevented from causing the extending motion of the extension and contraction allowance portion C. Therefore, it is possible to maintain the extension and contraction allowance portion C in a state when the external force is absorbed.

In particular, the extending motion force of the extension and contraction allowance portion C is increased as the pressure of the tap water in the flow path 5 is increased; however, the pressure of the tap water flowing into the fluid chamber 6 divergently from the flow path 5 is proportionally increased. Therefore, typically, it is possible to prevent the extending motion of the extension and contraction allowance portion C using a preventive force corresponding to a change in the internal pressure of the flow path 5.

In the first embodiment, the first lock ring 13, which comes into contact with the tip end surface of the inner joint body 8 (fitted onto the outer circumferential surface of the connection sleeve B) in the direction of the pipe axial line, is installed in the first ring installation groove 4a of the outer fitting sleeve 4; however, as a substitute for this configuration, an annular protrusion may be formed integrally with the outer fitting sleeve 4 in such a manner that the outer fitting sleeve 4 is positioned relative to the tip end surface of the inner joint body 8.

Second Embodiment

Figure 7:
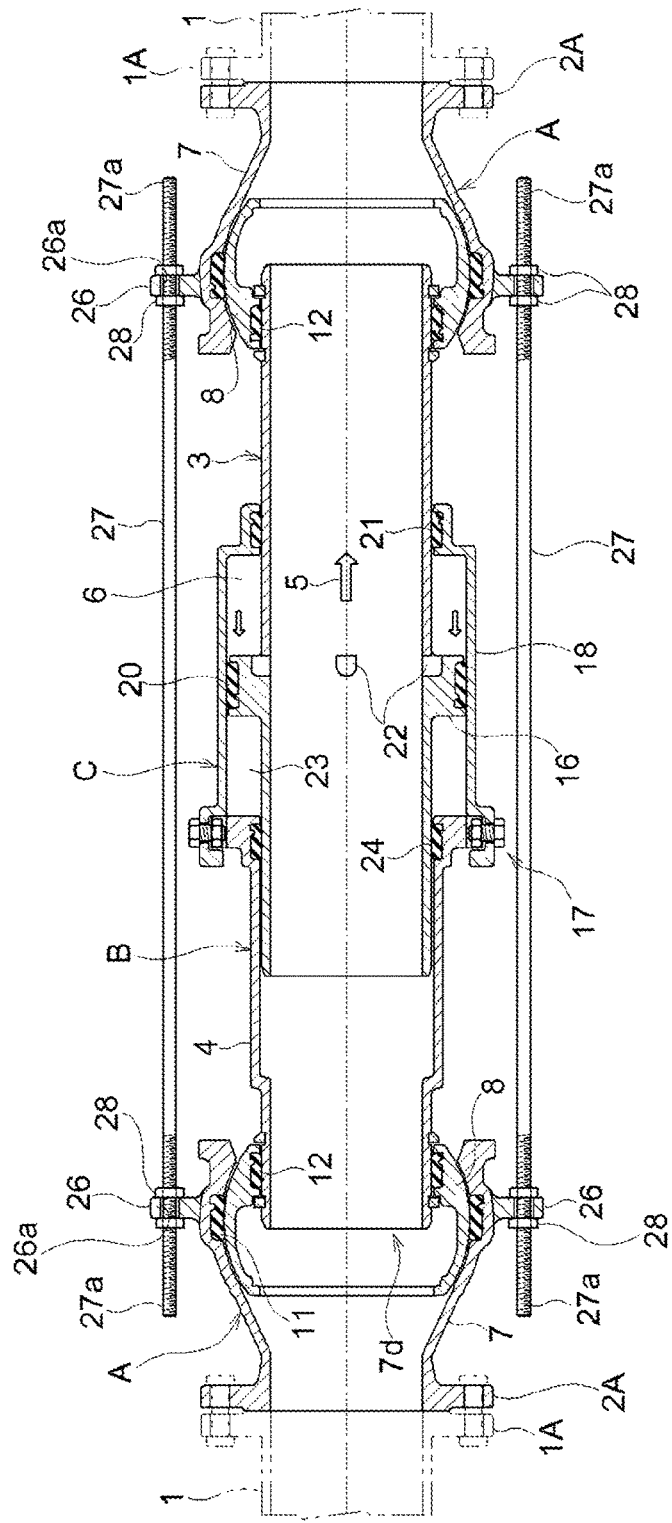
FIG. 7 is a longitudinal sectional view of an extendable and contractible flexible joint of a second embodiment.

As illustrated in FIG. 7, in the extendable and contractible flexible joint of the first embodiment, a limiting rod 27 may be attachably and detachably provided in a hanging manner across attachment portions 26, which protrude from the outer surface of the outer joint body 7 of each of both the flexible joint portions A, and limits the gap between both the outer joint bodies 7 in the direction of the pipe axial line, and is fractured by an external force greater than or equal to a set value.

As illustrated in FIG. 2, the attachment portions 26 respectively protrude from the maximum outer diameter portion of the outer surface of each of the outer joint bodies 7 at two circumferential locations, the limiting rod 27 with bolts are inserted through attachment holes 26a of each of two pairs of the attachment portions 26 facing each other in the direction of the pipe axial line, and a pair of nuts 28 is respectively screwed onto screw portions 27a formed in both side portions of the limiting rod 27 such that the limiting rod 27 is fixed while being interposed between the attachment portions 26.

For example, a fragile portion with a weak mechanical strength such as a small-diameter portion may be formed in a portion of the limiting rod 27, or the entire limiting rod 27 may be made to have a small outer diameter equivalent to that of the small-diameter portion such that the limiting rod 27 is fractured by the external force greater than or equal to the set value.

In a second embodiment, since the limiting rod 27 is provided in a hanging manner across the attachment portions 26 of the outer joint bodies 7 of both the flexible joint portions A, it is possible to fix the entire length of the extendable and contractible flexible joint to a set gap, and to fix the directional posture of both the outer joint bodies 7 in a set posture during the transportation of the extendable and contractible flexible joint that does not contain tap water, during pipe installation, or the like. Therefore, it is possible to easily and efficiently transport the extendable and contractible flexible joint or install pipes.

When an external force greater than or equal to a set value is applied to the extendable and contractible flexible joint due to an earthquake, land subsidence, or the like, the limiting rod 27 is fractured by the external force, the extension and contraction allowance portion C undergoes an extending and contracting motion, and the outer joint body 7 and the inner joint body 8 of the flexible joint portion A undergo a bending motion due to relative sliding between the spherical inner circumferential surface 7a of the outer joint body 7 and the spherical outer circumferential surface 8a of the inner joint body 8. Therefore, it is possible to absorb the external force while preventing the leakage of the pressure fluid caused by the breakup of configuration members of the extendable and contractible flexible joint.

When the external force is absorbed, a portion of tap water in the flow path 5 (formed by both the flexible joint portions A and the connection sleeve B) flows into the fluid chamber 6 of the extending motion limiting portion D, the water pressure of the inflowing tap water to the pressure receiving surfaces 6a and 6b (facing each other in the direction of the pipe axial line) of the fluid chamber 6 is applied such that the water pressure of the tap water flowing through the flow path 5 is prevented from causing the extending motion of the extension and contraction allowance portion C. Therefore, it is possible to maintain the extension and contraction allowance portion C in a state when the external force is absorbed.

When the limiting rod 27 is provided in a hanging manner across the attachment portions 26 of the outer joint bodies 7 of both the flexible joint portions A, an extending and contracting motion and a bending motion cannot be activated until the limiting rod 27 is fractured. Therefore, it is difficult to set the fracture load of the limiting rod 27. However, in this embodiment, since the limiting rod 27 is attachably and detachably provided in a hanging manner across the attachment portions 26 of the outer joint bodies 7 of both the flexible joint portions A, when the limiting rod 27 is removed from the attachment portions 26 of both the outer joint bodies 7 after the installation of pipes with the extendable and contractible flexible joint is completed, it is also possible to absorb an external force less than or equal to a set value by the extending and contracting motion and the bending motion of the extendable and contractible flexible joint.

Since other configuration parts are identical to those in the first embodiment, the same reference signs as in the first embodiment are assigned to the identical configuration parts, and the description thereof will be omitted.

Third Embodiment

Figure 8:
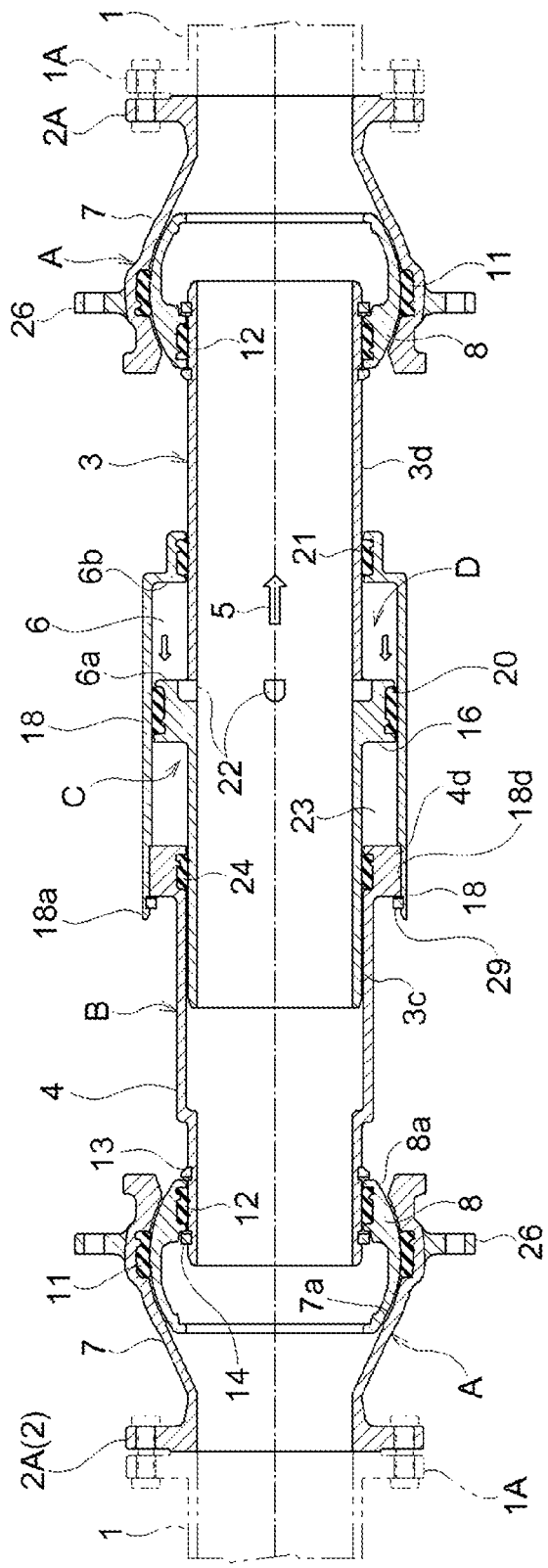
FIG. 8 is a longitudinal sectional view of an extendable and contractible flexible joint of a third embodiment.
Figure 9:
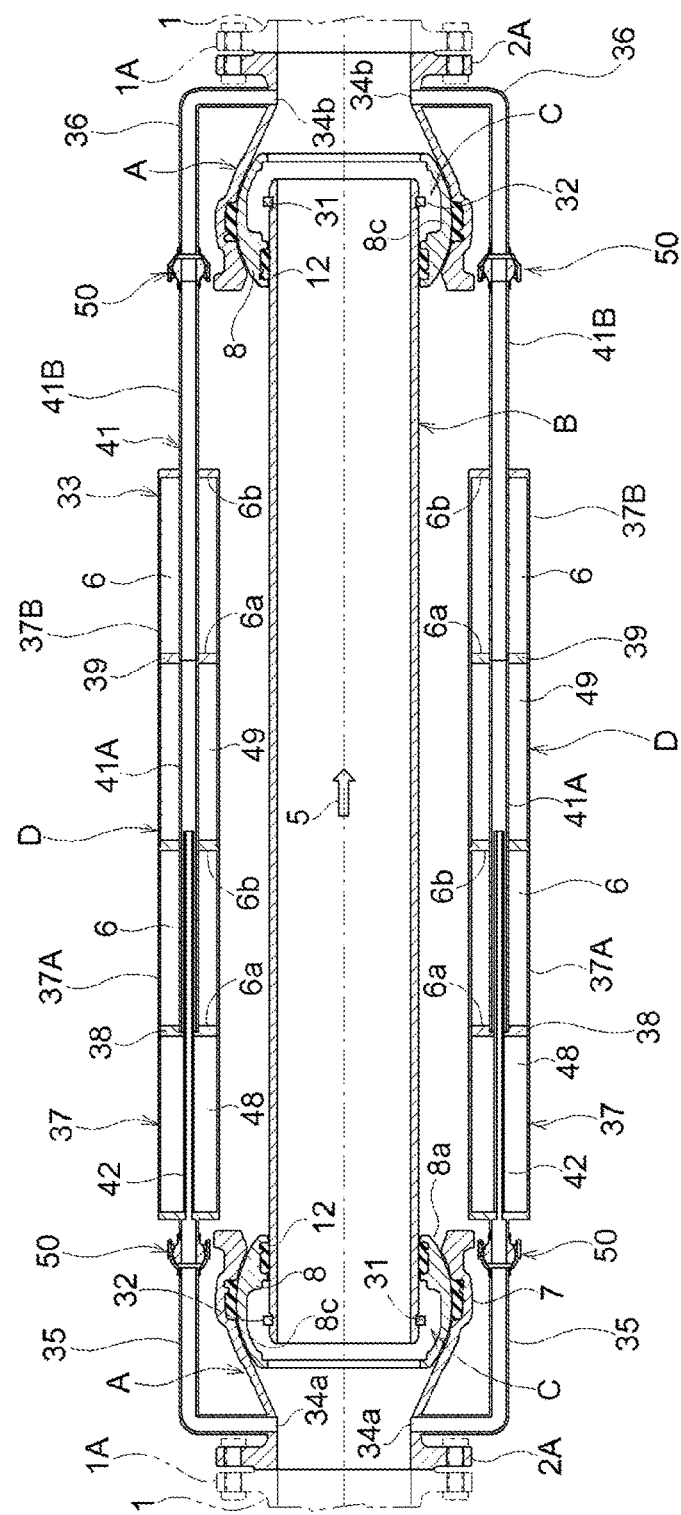
FIG. 9 is a longitudinal sectional view of an extendable and contractible flexible joint of a fourth embodiment.
Figure 10:
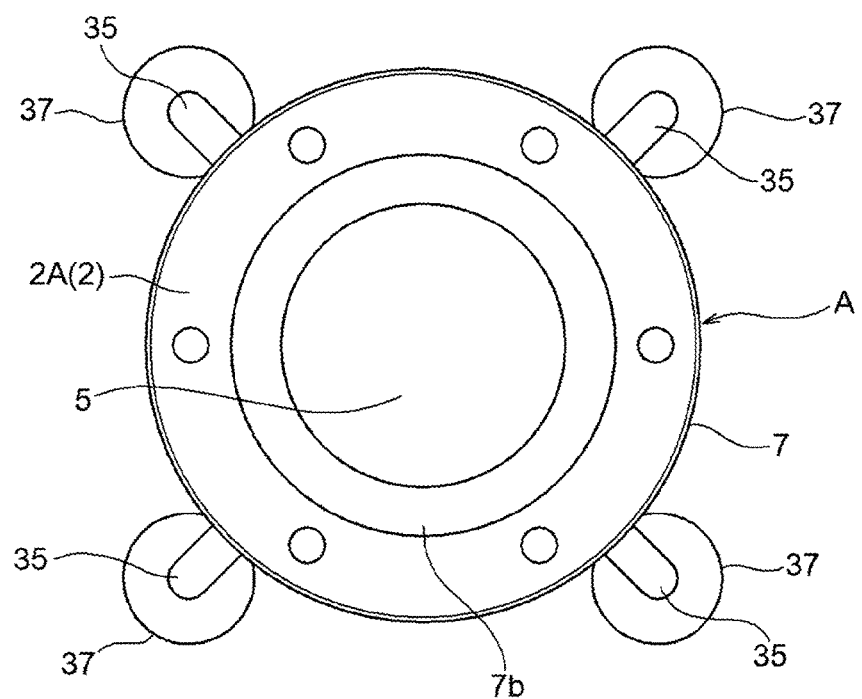
FIG. 10 is a front view of the extendable and contractible flexible joint.
Figure 11:
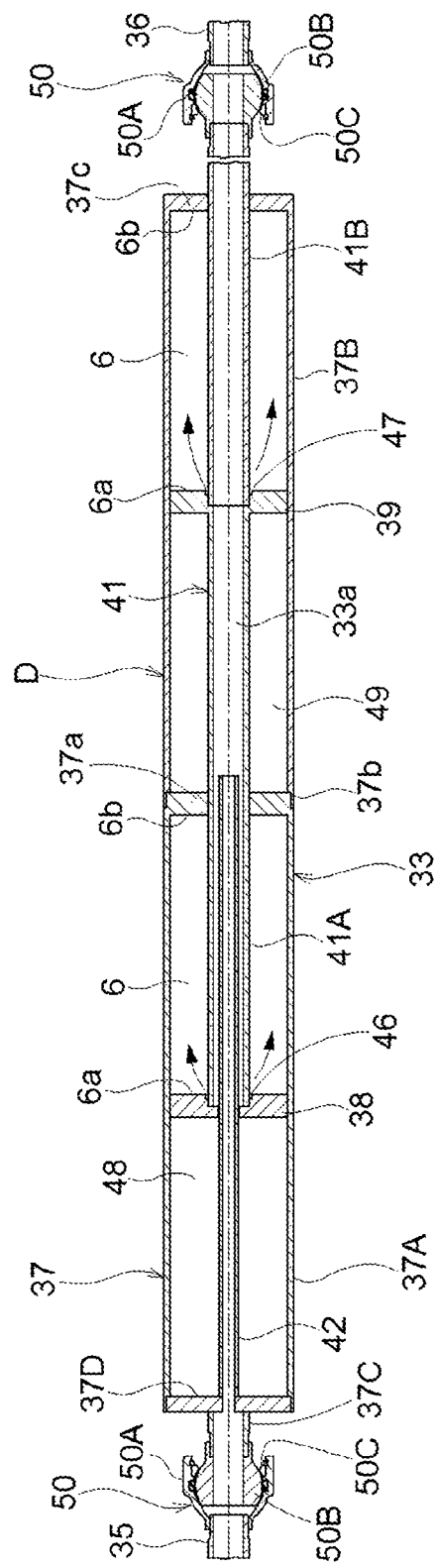
FIG. 11 is a longitudinal sectional view of a bypass pipe of the extendable and contractible flexible joint.

FIG. 8 illustrates another embodiment of a connection structure between the outer fitting sleeve 4 and the limiting sleeve 18 in the extendable and contractible flexible joint of the first embodiment.

In this embodiment, an annular concave portion 18d is formed in the inner circumferential surface of the connection opening portion 18a of the limiting sleeve 18, and an annular protrusive portion 4d is fitted into the annular concave portion 18d, and protrudes from the outer circumferential surface of an end portion on a sleeve-connection side of the outer fitting sleeve 4. A third lock ring 29 is attachably and detachably installed in a ring installation groove formed at an opening end of the annular concave portion 18d, comes into contact with the annular protrusive portion 4*d* fitted into the annular concave portion 18*d*, and prevents the annular protrusive portion 4*d* from moving and becoming separated from the limiting sleeve 18.

The third lock ring 29 has the same shape as that of the second lock ring 14 of the first embodiment, and is formed in the shape of a C, which is cut and separated at one circumferential location and can be elastically deformed in a direction in which the diameter of the third lock ring 29 is increased. The engagement holes 15 (refer to FIG. 2), which is an example of an engaging portion, are respectively formed in both of cut and separated end portions of the third lock ring 29 such that both the engaging portions of the diameter increasing tool (not illustrated) for increasing the diameter of the third lock ring 29 can be engaged and disengaged with and from the engagement holes 15.

Since other configuration parts are identical to those in the first embodiment, the same reference signs as in the first embodiment are assigned to the identical configuration parts, and the description thereof will be omitted.

Fourth Embodiment

FIGS. 9 to 12 illustrate another embodiment of the extendable and contractible flexible joint. In this embodiment, the outer joint body 7 and the inner joint body 8 of each of both the flexible joint portion A with the same shapes as in the first embodiment are used, and the extension and contraction allowance portion C is provided in a fitted connection portion between the inner joint body 8 and the connection sleeve B, which is fitted to the inner joint body in such a manner as to be slidable in the direction of the pipe axial line and rotable relative to the inner joint body 8, and allows relative movement between both the flexible joint portions A in the direction of the pipe axial line in the set movement range.

The extension and contraction allowance portion C is configured such that a fourth lock ring 32 is attachably and detachably installed in an annular ring installation groove 31 formed in an end portion of the outer circumferential surface of the connection sleeve B, and the fourth lock ring 32 comes into contact with each of both end portions (positioned in the direction of the pipe axial line) of the annular concave portions 8*c* of the inner joint bodies 8.

The movement margin of the fourth lock ring 32 in the direction of the pipe axial line in the annular concave portion 8*c* of each of both the inner joint bodies 8 becomes the extending and contracting motion margin of the connection sleeve B, and the inner joint body 8 of each of both the flexible joint bodies A.

The fourth lock ring 32 has the same shape as that of the second lock ring 14 of the first embodiment, and is formed in the shape of a C, which is cut and separated at one circumferential location and can be elastically deformed in a direction in which the diameter of the fourth lock ring 32 is increased. The engagement holes 15 (refer to FIG. 2), which is an example of an engaging portion, are respectively formed in both of the cut and separated end portions of the fourth lock ring 32 such that both the engaging portions of the diameter increasing tool (not illustrated) for increasing the diameter of the fourth lock ring 32 can be engaged and disengaged with and from the engagement holes 15.

The extending motion limiting portion D is provided in the extendable and contractible flexible joint of the embodiment while being installed outside, and includes the fluid chamber 6 into which a portion of tap water (an example of the pressure fluid) in the flow path 5, formed by both the flexible joint portions A and the connection sleeve B, diverges and flows, and is configured to apply the water pressure of the inflowing tap water to pressure receiving surfaces 6*a* and 6*b* (facing each other in the direction of the pipe axial line) of the fluid chamber 6 in such a manner that the water pressure flowing through the flow path 5 is prevented from causing the extending motion of the extension and contraction allowance portion C.

The extending motion limiting portion D includes a bypass pipe 33, which is connected across the respective outer joint bodies 7 of both the flexible joint portions A while being installed outside, and the fluid chamber 6 into which a portion of the tap water in a bypass flow path 33*a* of the bypass pipe 33 flows. The extending motion limiting portion D is configured such that the water pressure of the inflowing tap water to both the pressure receiving surfaces 6*a* and 6*b* of the fluid chamber 6 is applied to the respective outer joint bodies 7 of both the flexible joint portions A via the bypass pipe 33.

The bypass pipes 33 are connected in a communicating manner to the respective outer joint bodies 7 of both the flexible joint portions A at a plurality (four in this embodiment) of circumferential locations, two fluid chambers 6 are formed in each of the bypass pipe 33, and the total cross-sectional area of the fluid chambers 6 of the bypass pipes 33 is set to be equal to the internal cross-sectional area of the connection sleeve B.

Each of the bypass pipes 33 includes a first connection pipe 35 that has an L shape and is connected in a communicating manner to a first through hole 34*a* formed in a small-diameter portion of the upstream outer joint body 7; a second connection pipe 36 that has an L shape and is connected to a second through hole 34*b* formed in a small-diameter portion of the downstream outer joint body 7; a cylinder case 37 connected to an end portion of the first connection pipe 35; two pistons 38 and 39 that slide along the inner circumferential surface of the cylinder case 37; and a piston pipe 41 connected to an end portion of the second connection pipe 36.

The cylinder case 37 includes a first cylinder tube 37A in which the upstream piston 38 is slidably accommodated and which opens toward an upstream side, and a second cylinder tube 37B in which the downstream piston 39 is slidably accommodated and which opens toward the upstream side. An opening-side end portion 37*b* of the second cylinder tube 37B is screw-joined to a bottom wall portion 37*a* of the first cylinder tube 37A, and a cover member 37D with a connection pipe portion 37C connected to the first connection pipe 35 is screw-joined to an opening-side end portion of the first cylinder tube 37A.

A dead water avoidance guiding pipe 42 is fixedly attached to the inner surface of the cover member 37D, communicates with the connection pipe portion 37C, water-tightly passes through the upstream piston 38, and penetrates into the piston pipe 41.

The piston pipe 41 includes a first piston pipe body 41A that passes through the bottom wall portion 37*a* of the first cylinder tube 37A in such a manner as to be able to slide along the direction of the pipe axial line, and a second piston pipe body 41B that passes through a bottom wall portion 37*c* of the second cylinder tube 37B in such a manner as to be able to slide along the direction of the pipe axial line.

The upstream piston 38 is screw-joined to an upstream end portion of the first piston pipe body 41A, and an upstream end portion of the second piston pipe body 41B is screw-joined to the downstream piston 39, formed integrally with a downstream end portion of the first piston pipe body 41A, while communicating with the downstream end portion of the first piston pipe body 41A.

Figure 12:
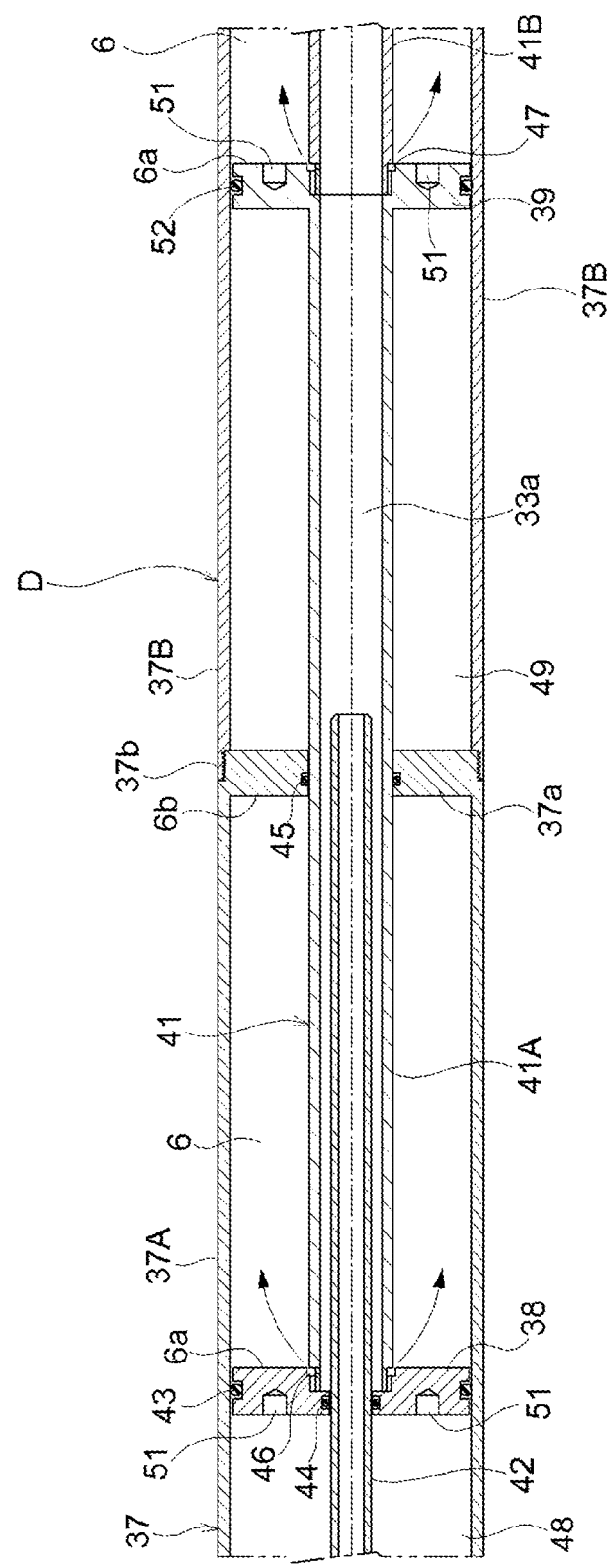
FIG. 12 is an enlarged longitudinal sectional view of main parts of the bypass pipe of the extendable and contractible flexible joint.
Figure 13:
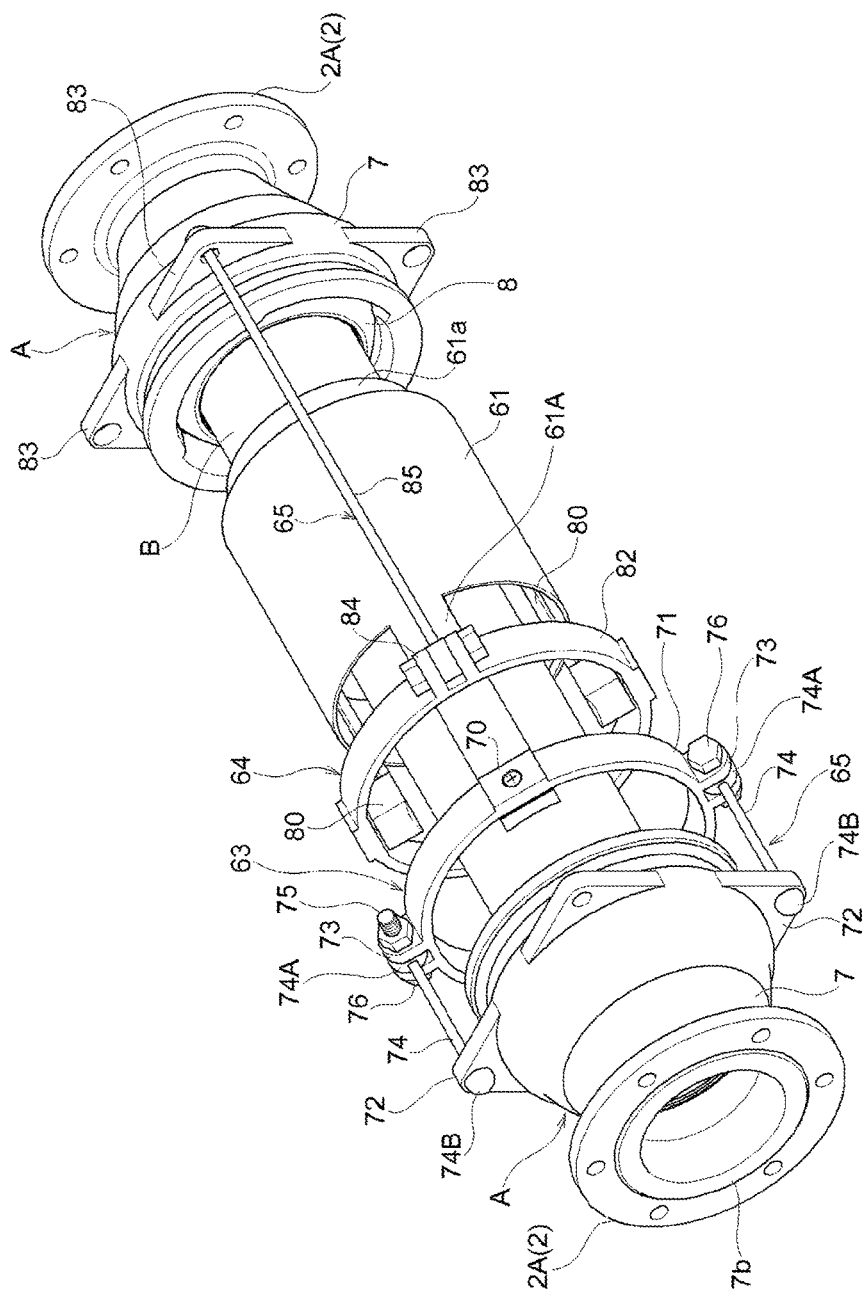
FIG. 13 is a perspective view of an extendable and contractible flexible joint of a fifth embodiment.
Figure 14:
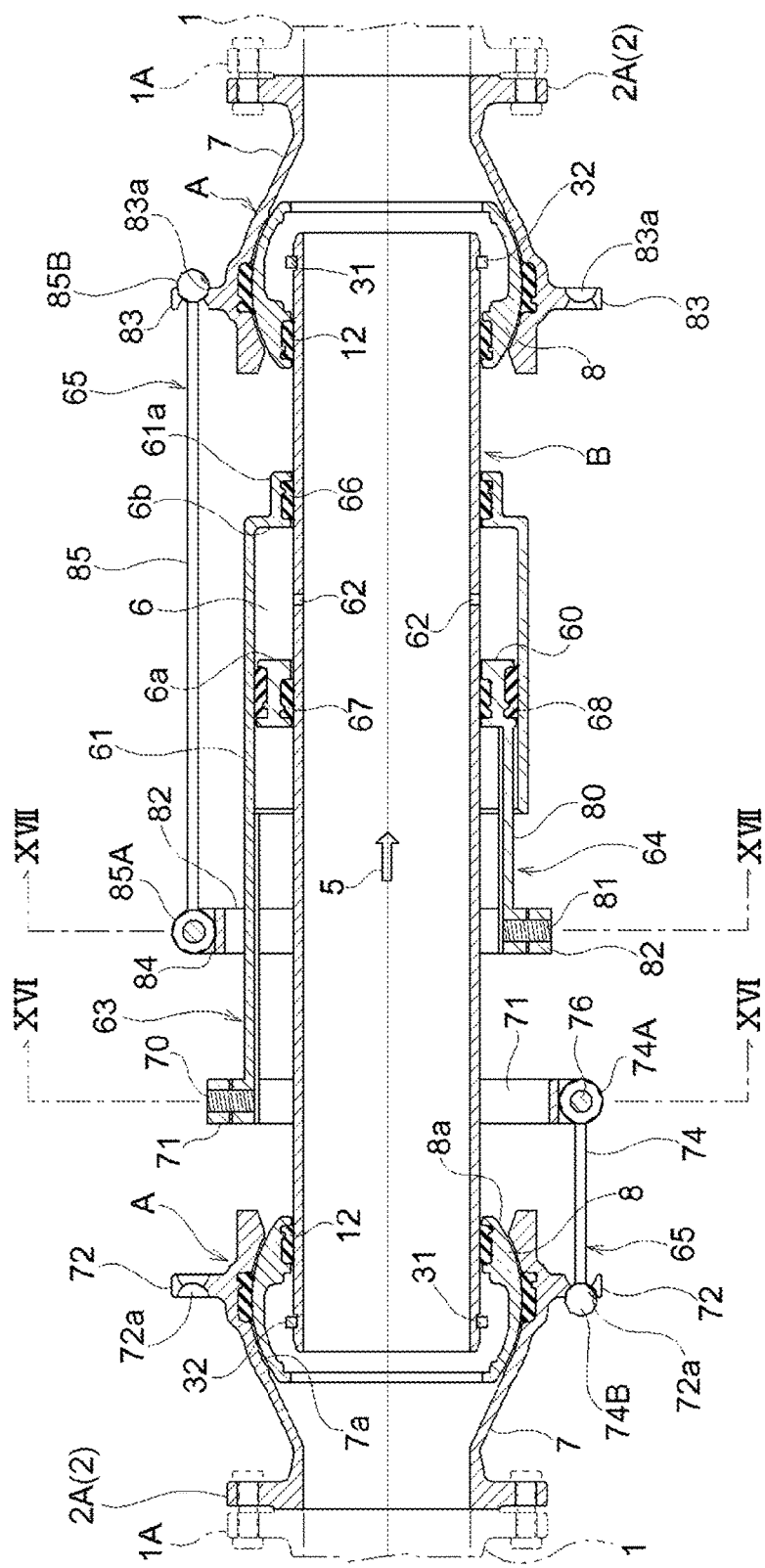
FIG. 14 is a longitudinal sectional view taken along line XIV-XIV in FIG. 16.
Figure 15:
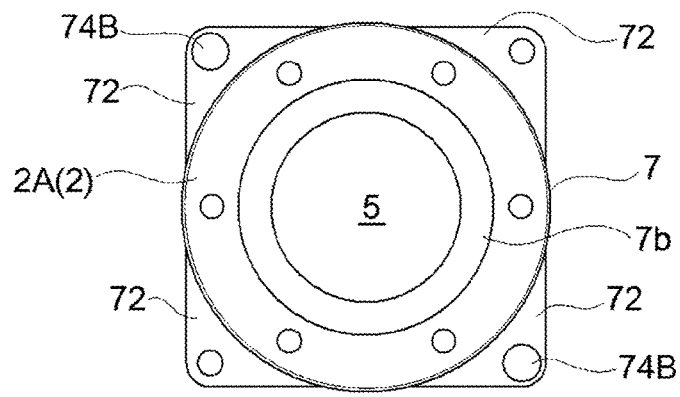
FIG. 15 is a front view of the extendable and contractible flexible joint.
Figure 16:
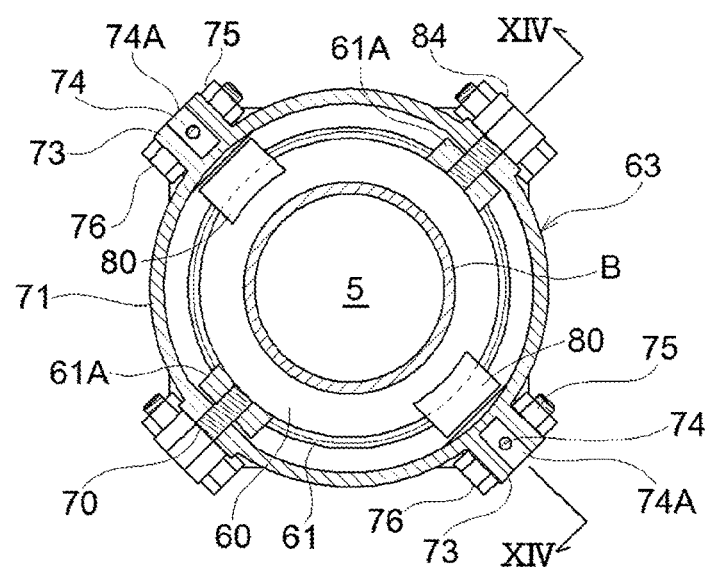
FIG. 16 is a lateral sectional view taken along line XVI-XVI in FIG. 14.
Figure 17:
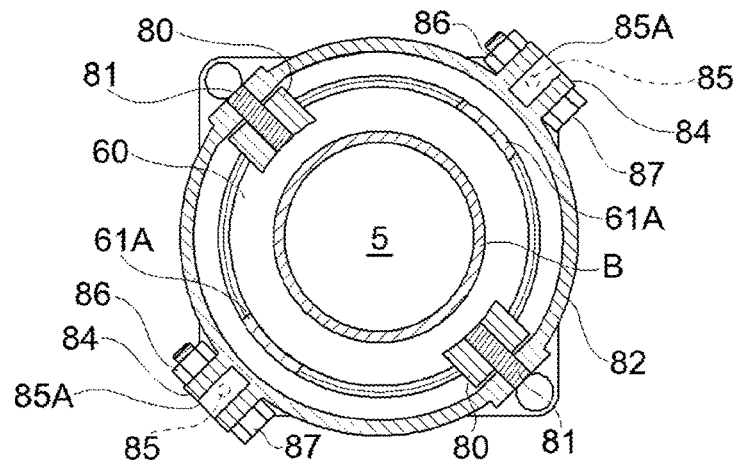
FIG. 17 is a lateral sectional view taken along line XVII-XVII in FIG. 14.

As illustrated in FIG. 12, a first O-ring 43 is provided in the outer circumferential surface of the upstream piston 38, and works as a seal member that is configured to slidably and water-tightly seal a gap between the outer circumferential surface of the upstream piston 38 and the inner circumferential surface of the first cylinder tube 37A. A second O-ring 44 is provided in the inner circumferential surface of the upstream piston 38, and work as a seal member that is configured to slidably and water-tightly seal a gap between the inner circumferential surface of the upstream piston 38 and the outer circumferential surface of the guiding pipe 42. A third O-ring 45 is provided in the inner circumferential surface of a pipe through hole of the bottom wall portion 37a of the first cylinder tube 37A, and works as a seal member that is configured to slidably and water-tightly seal a gap between the inner circumferential surface of the pipe through hole and the outer circumferential surface of the first piston pipe body 41A.

In addition, similar to the upstream piston 38, a fourth O-ring 52 is provided in the outer circumferential surface of the downstream piston 39, and works as a seal member that is configured to slidably and water-tightly seal a gap between the outer circumferential surface of the downstream piston 39 and the inner circumferential surface of the second cylinder tube 37B. A fifth O-ring (not illustrated) is provided in the inner circumferential surface of a pipe through hole of the bottom wall portion 37c of the second cylinder tube 37B, and works as a seal member that is configured to slidably and water-tightly seal a gap between the inner circumferential surface of the pipe through hole and the outer circumferential surface of the second piston pipe body 41B.

As a result, the fluid chamber 6 is configured as a downstream chamber out of two chambers in the first cylinder tube 37A, which are partitioned off by the upstream piston 38, and communicates with the bypass flow path 33a via a third through hole 46 that passes through a screw joint portion between the upstream piston 38 and the first piston pipe body 41A.

In addition, the fluid chamber 6 is configured as a downstream chamber out of two chambers in the second cylinder tube 37B, which are partitioned off by the downstream piston 39, and communicates with the bypass flow path 33a via a fourth through hole 47 that passes through a screw joint portion between the downstream piston 39 and the second piston pipe body 41B.

The water pressure of the inflowing tap water to the pressure receiving surfaces 6a and 6b (facing each other in the direction of the pipe axial line) of the fluid chamber 6 in the first cylinder tube 37A, and the water pressure of the inflowing tap water to the pressure receiving surfaces 6a and 6b (facing each other in the direction of the pipe axial line) of the fluid chamber 6 in the second cylinder tube 37B are applied to the respective outer joint bodies 7 of both the flexible joint portions A via the cylinder case 37, the piston pipe 41, the first connection pipe 35, and the second connection pipe 36, all of which are configuration members of the bypass pipe 33, such that the water pressure of the tap water flowing through the flow path 5 is prevented from causing the extending motion of the extension and contraction allowance portion C.

An air chamber 48 is configured as an upstream chamber in the first cylinder tube 37A that communicates with the external space via helical apertures formed in the screw joint portion between the first cylinder tube 37A and the cover member 37D. An air chamber 49 is configured as an upstream chamber in the second cylinder tube 37B that communicates with the external space via helical apertures formed in a screw joint portion between the first cylinder tube 37A and the second cylinder tube 37B.

The inside air of the air chamber 48 in the first cylinder tube 37A, and the inside air of the air chamber 49 in the second cylinder tube 37B are discharged to the external space as both the inner joint bodies 8 and the connection sleeve B undergo a contracting motion, and the air is suctioned into the air chamber 48 in the first cylinder tube 37A and the air chamber 49 in the second cylinder tube 37B from the external space as both the inner joint bodies 8 and the connection sleeve B undergo an extending motion.

Flexible connection portions 50 are respectively provided between the first connection pipe 35 and the cover member 37D of the cylinder case 37, which are upstream portions of the bypass pipe 33, and between the second connection pipe 36 and the second piston pipe body 41B, which are downstream portions of the bypass pipe 33, in such a manner as to allow bending resulting from sliding between the spherical inner circumferential surface 7a of the outer joint body 7 and the spherical outer circumferential surface 8a of the inner joint body 8.

The flexible connection portion 50 includes the following main configuration members: an outer connection member 50A with a spherical inner circumferential surface, which is screw-joined to the first connection pipe 35 or the second connection pipe 36; an inner connection member 50B with a spherical outer circumferential surface, which is slidably and water-tightly fitted along the spherical inner circumferential surface of the outer connection member 50A and is screw-joined to the connection pipe portion 37C of the cover member 37D or the second piston pipe body 41B; and an annular retainer member 50C that prevents the inner connection member 50B (slidably fitted to the outer connection member 50A) from moving and being separated.

The stroke motion of both the pistons 38 and 39 of the piston pipe 41 relative to the cylinder case 37 is set to be equal to, or greater than or equal to the total amount of motion which is obtained by adding the amount of extending motion of the extension and contraction allowance portion C to the amount of bending motion resulting from sliding between the spherical inner circumferential surface 7a of the outer joint body 7 and the spherical outer circumferential surface 8a of the inner joint body 8.

Engagement holes 51 for a rotating tool, used to screw-join the upstream piston 38 to the first piston pipe body 41A, are concave in the upstream piston 38 and the downstream piston 39.

Since other configuration parts are identical to those in the first embodiment, the same reference signs as in the first embodiment are assigned to the identical configuration parts, and the description thereof will be omitted.

Fifth Embodiment

FIGS. 13 to 17 illustrate another embodiment of the extendable and contractible flexible joint. In this embodiment, the outer joint body 7 and the inner joint body 8 of each of both the flexible joint portion A with the same shapes as in the first embodiment are used, and similar to the fourth embodiment, the extension and contraction allowance portion C is provided in the fitted connection portion between the inner joint body 8 and the connection sleeve B, which is fitted to the inner joint body in such a manner as to be slidable in the direction of the pipe axial line and rotable relative to the inner joint body 8, and allows relative movement between both the flexible joint portions A in the direction of the pipe axial line in the set movement range.

The extension and contraction allowance portion C is configured such that the fourth lock ring 32 is attachably and detachably installed in the annular ring installation groove 31 formed in the end portion of the outer circumferential surface of the connection sleeve B, and the fourth lock ring 32 comes into contact with each of both end portions (positioned in the direction of the pipe axial line) of the annular concave portions 8c of the inner joint bodies 8.

The movement margin of the fourth lock ring 32 in the direction of the pipe axial line in the annular concave portion 8c of each of both the inner joint bodies 8 becomes the extending and contracting motion margin of the connection sleeve B, and the inner joint body 8 of each of both the flexible joint bodies A.

The extending motion limiting portion D is provided in the extendable and contractible flexible joint of the embodiment while being installed outside, and includes the fluid chamber 6 into which a portion of tap water (an example of the pressure fluid) in the flow path 5, formed by both the flexible joint portions A and the connection sleeve B, diverges and flows, and is configured to apply the water pressure of the inflowing tap water to pressure receiving surfaces 6a and 6b (facing each other in the direction of the pipe axial line) of the fluid chamber 6 in such a manner that the water pressure flowing through the flow path 5 is prevented from causing the extending motion of the extension and contraction allowance portion C.

The extending motion limiting portion D includes an annular movable body 60 that is provided in such a manner as to be able to slide along the outer circumferential surface of the connection sleeve B in the direction of the pipe axial line; a cylindrical movable case 61 that encloses an outer circumferential side and a downstream side of the annular movable body 60 in such a manner as to be able to slide against the annular movable body 60, and is provided in such a manner as to be able to slide along the outer circumferential surface of the connection sleeve B in the direction of the pipe axial line; the fluid chamber 6 that is sealed with a first surface of the annular movable body 60 and the inner surface of the cylindrical movable case 61, and communicates with the flow path 5 via a fifth through hole 62 formed in the connection sleeve B; a first connection mechanism 63 that connects the cylindrical movable case 61 to the outer joint body 7 of one (positioned on the upstream side) of the flexible joint portions A; and a second connection mechanism 64 that connects the annular movable body 60 to the outer joint body 7 of the other (positioned on the downstream side) of the flexible joint portions A.

The water pressure of the inflowing tap water to the pressure receiving surfaces 6a and 6b (facing each other in the direction of the pipe axial line) of the fluid chamber 6 is applied to the respective outer joint bodies 7 of both the flexible joint portions A via the annular movable body 60, the cylindrical movable case 61, the first connection mechanism 63, and the second connection mechanism 64 such that the water pressure of the tap water flowing through the flow path 5 is prevented from causing the extending motion of the extension and contraction allowance portion C.

Flexible connection portions 65 are respectively provided in a connection portion between the first connection mechanism 63 and the outer joint body 7 of the upstream flexible joint portion A, and in a connection portion between the second connection mechanism 64 and the outer joint body 7 of the downstream flexible joint portion A in such a manner as to allow bending resulting from sliding between the spherical inner circumferential surface 7a of the outer joint body 7 and the spherical outer circumferential surface 8a of the inner joint body 8.

A sixth rubber ring 66 is provided in an annular seal installation groove formed in the inner circumferential surface of a sliding portion 61a of a downstream end portion of the cylindrical movable case 61, and works as a seal member that is configured to slidably and water-tightly seal a gap between the outer circumferential surface of the connection sleeve B and the inner circumferential surface of the sliding portion 61a on a downstream side of the fifth through hole 62.

A seventh rubber ring 67 is provided in an annular seal installation groove formed in the inner circumferential surface of the annular movable body 60, and works as a seal member that is configured to slidably and water-tightly seal a gap between the outer circumferential surface of the connection sleeve B and the inner circumferential surface of the annular movable body 60 on an upstream side of the fifth through hole 62. An eighth rubber ring 68 is provided in an annular seal installation groove formed in the outer circumferential surface of the annular movable body 60, and works as a seal member that is configured to slidably and water-tightly seal a gap between the outer circumferential surface of the annular movable body 60 and the inner circumferential surface of the cylindrical movable case 61.

As a result, the fluid chamber 6 is configured as an annular chamber, which is water-tightly sealed with the inner circumferential surface of the cylindrical movable case 61, an annular downstream side surface of the annular movable body 60, and the outer circumferential surface of the connection sleeve B, and communicates with the flow path 5 via the fifth through hole 62.

The first connection mechanism 63 includes the following members in an upstream end portion of the cylindrical movable case 61 at two locations facing each other in a diameter direction: a first connection arm 61A that is provided integrally with the cylindrical movable case 61 while extending in the direction of the pipe axial line; a first connection ring 71 that is fixed, connected across tip end portions of a pair of the first connection arms 61A using screw members 70; first connection pieces 72 that protrude from the maximum outer diameter portion of the outer surface of the upstream outer joint body 7 at four circumferential locations; a pair of first brackets 73, each of which is formed at a position that is circumferentially offset by 90° from a connection portion between the first connection ring 71 and the first connection arm 61A; and a first connection rod 74 that connects the first connection piece 72 of the outer joint body 7 to the first bracket 73 of the first connection ring 71 while being bendable, the first connection piece 72 and the first bracket 73 facing each other in the direction of the pipe axial line.

The flexible connection portion 65, provided in a connection portion between the first connection mechanism 63 and the upstream outer joint body 7, is configured such that a boss portion 74A (formed in a downstream end portion of the first connection rod 74) is pivotally fitted to the first bracket 73 in such a manner as to be able to swing around the bolt axis of a bolt 76 which is tightened to the first bracket 73 of the first connection ring 71 using a nut 75, and a first ball 74B is fixedly attached to an upstream end portion of the first connection rod 74 (passing through the first connection piece 72) in such a manner as to be able to slide against a spherical concave surface 72a formed in the first connection piece 72.

The second connection mechanism 64 includes a second connection arm 80 that protrudes toward the upstream side from the annular movable body 60 through the inside of the cylindrical movable case 61 at two circumferential locations; a second connection ring 82 that is fixed, connected across tip end portions of a pair of the second connection arms 80 using screw members 81; second connection pieces 83 that protrude from the maximum outer diameter portion of the outer surface of the downstream outer joint body 7 at four circumferential locations; a pair of second brackets 84, each of which is formed at a position which is circumferentially offset by 90° from a connection portion between the second connection ring 82 and the second connection arm 80; and a second connection rod 85 that connects the second connection piece 83 of the outer joint body 7 to the second bracket 84 of the second connection ring 82 while being bendable, the second connection piece 83 and the second bracket 84 facing each other in the direction of the pipe axial line.

The flexible connection portion 65, provided in a connection portion between the second connection mechanism 64 and the downstream outer joint body 7, is configured such that a boss portion 85A (formed in an upstream end portion of the second connection rod 85) is pivotally fitted to the second bracket 84 in such a manner as to be able to swing around the bolt axis of a bolt 87 which is tightened to the second bracket 84 of the second connection ring 82 using a nut 86, and a second ball 85B is fixedly attached to a downstream end portion of the second connection rod 85 (passing through the second connection piece 83) in such a manner as to be able to slide against a spherical concave surface 83a formed in the second connection piece 83.

The cross-sectional area of the fluid chamber 6 of the extending motion limiting portion D is set to be equal to the internal cross-sectional area of the connection sleeve B, and the extending force of the extension and contraction allowance portion C induced by the water pressure of the tap water flowing through the flow path 5 balances out the extension preventive force induced by the water pressure of the tap water flowing into the fluid chamber 6.

Since other configuration parts are identical to those in the first embodiment, the same reference signs as in the first embodiment are assigned to the identical configuration parts, and the description thereof will be omitted.

Other Embodiments (1) The connection sleeve B of the extendable and contractible flexible joint may be made up of the inner fitting sleeve and the outer fitting sleeve which are fitted and connected together in such a manner that the inner fitting sleeve and the outer fitting sleeve are extendable and contractible in the direction of the pipe axial line and are rotatable relative to each other. The extending motion limiting portion may include the bypass pipe, which is connected across the inner fitting sleeve and the outer fitting sleeve while being installed outside, and the fluid chamber into which a portion of a pressure fluid in the bypass flow path of the bypass pipe flows. A fluid pressure applied to the pressure receiving surfaces of the fluid chamber may be applied to the inner fitting sleeve and the outer fitting sleeve via the bypass pipe such that the pressure fluid flowing through the flow path is prevented from causing the extending motion of the extension and contraction allowance portion.

(2) In the first embodiment, the flexible joint portion A is made up of two members: the outer joint body 7 with the spherical inner circumferential surface 7a and the inner joint body 8 with the spherical outer circumferential surface 8a, and it is possible to attach and detach the inner joint body 8 to and from the outer joint body 7, and retain the inner joint body 8 relative to the outer joint body 7 by changing the posture of the inner joint body 8 relative to the outer joint body 7; however, as with the flexible connection portion 50 of the fourth embodiment, the flexible joint portion A may include the outer joint body 7 with the spherical inner circumferential surface 7a; the inner joint body 8 with the spherical outer circumferential surface 8a; and the annular retainer member that prevents the inner joint body 8 (slidably fitted to the outer joint body 7) from moving and being separated.

(3) In the first embodiment, the connection flange 2A, formed integrally with the outer circumferential surface of the outer joint body 7, is provided as the connection portion 2 of the outer joint body 7 for the fluid transfer pipe such as the water pipe 1; however, an insertion joint or a socket joint may be adopted instead the flange joint.

(4) Each of the embodiments is illustrated using the water pipe 1 as an example; however, the present invention may be applied to other fluid transfer pipes such as a gas pipe and a plant pipe.

(5) In the extendable and contractible flexible joint of the first embodiment, one end portion of an extension sleeve may be water-tightly fitted and connected to an end portion of the inner fitting sleeve 3 or an end portion of the outer fitting sleeve 4.

In this case, the first lock ring 13 and the second lock ring 14 are installed in the other end portion of the extension sleeve such that the first lock ring 13 and the second lock ring 14 come into contact with the inner joint body 8 installed on the outer circumferential surface of the extension sleeve and prevents the inner joint body 8 from becoming separated from the extension sleeve.

INDUSTRIAL APPLICABILITY

The present invention can be suitably applied to an extendable and contractible flexible joint with an extension and contraction function and a bending function, connected to a fluid transfer pipe such as a water pipe, a gas pipe, or a plant pipe, which is required to prevent a pressure fluid flowing through a flow path from causing the extending motion of an extension and contraction allowance portion while absorbing an external force induced by an earthquake, land subsidence, or the like, and improving the ease of assembly of the entire extendable and contractible flexible joint.

DESCRIPTION OF REFERENCE NUMERALS AND SIGNS

A: flexible joint portion
B: connection sleeve
C: extension and contraction allowance portion
D: extending motion limiting portion
1: fluid transport pipe (water pipe)
2: connection portion
3: inner fitting sleeve
4: outer fitting sleeve
5: flow path
6: fluid chamber
6a: pressure receiving surface
6b: pressure receiving surface
7: outer joint body 7a: spherical inner circumferential surface
8: inner joint body
8a: spherical outer circumferential surface
16: annular protrusion
17: bayonet joint
18: limiting sleeve
22: through hole
33: bypass pipe
33a: bypass flow path
50: flexible connection portion
60: annular movable body
61: cylindrical movable case
62: through hole (fifth through hole)
63: first connection mechanism
64: second connection mechanism
65: flexible connection portion

The invention claimed is:

1. An extendable and contractible flexible joint comprising:
a pair of flexible joint portions that are bendable and have a connection portion for a fluid transport pipe;
a connection sleeve that is fitted and connected across both the flexible joint portions, the connection sleeve including an extendable and contractible inner fitting sleeve and outer fitting sleeve; and
an extension and contraction allowance portion that is provided between the inner fitting sleeve and the outer fitting sleeve such that relative movement between both the flexible joint portions in a direction of a pipe axial line is allowed in a set movement range,
wherein each of both the flexible joint portions is made up of an outer fitting body with the connection portion, and an inner joint body with a spherical outer circumferential surface slidably fitted to a spherical inner circumferential surface of the outer joint body, and
wherein the extendable and contractible flexible joint further comprises:
a limiting sleeve enclosing an annular protrusion protruding from an intermediate portion of an outer circumferential surface of the inner fitting sleeve to be relatively slidable with each other, the limiting sleeve having one end portion joined to the outer fitting sleeve;
a first chamber part and a second chamber part defined in an internal space between the inner fitting sleeve and the limiting sleeve and separated by the annular protrusion, the first chamber part being defined in an air chamber communicating with an external space, the second chamber part being defined in a fluid chamber into which a portion of a pressure fluid in a flow path, formed by both the flexible joint portions and the connection sleeve, diverges and flows, and
an extending motion limiting portion that is formed by at least one through hole formed in the inner fitting sleeve for allowing communication between the flow path and the fluid chamber, and that is configured to apply a fluid pressure applied to pressure receiving surfaces of the fluid chamber in such a manner that the pressure fluid flowing through the flow path is prevented from causing an extending motion of the extension and contraction allowance portion, and
wherein the inner joint body of each of both the flexible joint portions is configured in such a manner as to be attachable and detachable to and from the connection sleeve in the direction of the pipe axial line, and the outer joint body and the inner joint body of each of both the flexible joint portions are configured in such a manner as to be attachable and detachable to and from each other in the direction of the pipe axial line.

2. The extendable and contractible flexible joint according to claim 1, wherein a cross-sectional area of the fluid chamber of the extending motion limiting portion is set to be equal to an internal cross-sectional area of the connection sleeve.

3. The extendable and contractible flexible joint according to claim 1, wherein a limiting rod is attachably and detachably provided in a hanging manner across attachment portions, which protrude from an outer surface of the outer joint body of each of both the flexible joint portions, and limits a gap between both the outer joint bodies to a set gap, and is fractured by an external force greater than or equal to a set value.

4. The extendable and contractible flexible joint according to claim 1, wherein the limiting sleeve includes an annular concave portion formed in an inner circumferential surface of the limiting sleeve at the one end portion thereof to receive, in a pipe axial direction, an annular protrusion protruding from an outer circumferential surface of the outer fitting sleeve at an end portion thereof, and a C-shaped lock ring attachably and detachably installed in an opening portion of the limiting sleeve adjacent to the annular concave portion to prevent the annular protrusion fitted into the annular concave portion from being removed from the annular concave portion.

5. The extendable and contractible flexible joint according to claim 1, wherein the at least one through hole comprises a plurality of through holes extending through the inner fitting sleeve in which the annular protrusion is formed.

* * * * *